(12) United States Patent
Yoshida et al.

(10) Patent No.: US 10,747,773 B2
(45) Date of Patent: Aug. 18, 2020

(54) DATABASE MANAGEMENT SYSTEM, COMPUTER, AND DATABASE MANAGEMENT METHOD

(75) Inventors: Michiko Yoshida, Tokyo (JP); Akira Shimizu, Tokyo (JP); Seisuke Tokuda, Tokyo (JP); Kazuhiko Mogi, Tokyo (JP); Shinji Fujiwara, Tokyo (JP); Nobuo Kawamura, Tokyo (JP); Masaru Kitsuregawa, Tokyo (JP); Kazuo Goda, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 505 days.

(21) Appl. No.: 14/402,878

(22) PCT Filed: May 24, 2012

(86) PCT No.: PCT/JP2012/063332
§ 371 (c)(1),
(2), (4) Date: Nov. 21, 2014

(87) PCT Pub. No.: WO2013/175609
PCT Pub. Date: Nov. 28, 2013

(65) Prior Publication Data
US 2015/0169591 A1 Jun. 18, 2015

(51) Int. Cl.
*G06F 16/25* (2019.01)
*G06F 16/2455* (2019.01)
(Continued)

(52) U.S. Cl.
CPC ........ *G06F 16/252* (2019.01); *G06F 16/2455* (2019.01); *G06F 16/24532* (2019.01); *G06F 16/24569* (2019.01)

(58) Field of Classification Search
CPC ........... G06F 17/3056; G06F 17/30477; G06F 17/30519; G06F 17/30445; G06F 17/30; G96F 17/30
(Continued)

(56) References Cited

U.S. PATENT DOCUMENTS

| 6,108,653 A | 8/2000 | Pereira |
| 2007/0022100 A1* | 1/2007 | Kitsuregawa ..... G06F 16/24542 |

FOREIGN PATENT DOCUMENTS

| JP | 2002-523839 A | 7/2002 |
| JP | 2007-034414 A | 2/2007 |

(Continued)

OTHER PUBLICATIONS

Harizopoulos, Stavros: QPipe: A simultaneously Pipelined Relational Query Engine; 2005, pp. 383-394, ISBN: 978-59593-060-6.*

(Continued)

*Primary Examiner* — Hosain T Alam
*Assistant Examiner* — Tracy M McGhee
(74) *Attorney, Agent, or Firm* — Mattingly & Malur, PC

(57) ABSTRACT

A database management system (DBMS) manages a database existing in a second storage device with an access speed lower than that of a first storage device. In an execution of a query, the DBMS dynamically generates tasks two or more executable tasks in parallel. The DBMS generates task start information which is information representing a content of the execution of the task, manages the task start information, and executes a content represented by the task start information by the task. The task start information includes a data address set existing in the second storage device. The DBMS controls movement of the data address sets between the first storage device and the second storage device based on a management state of the task start information. In addition, the DBMS selects the task start information based on
(Continued)

Table A

| A_factory_id | A_factory_name | A_factory_size | A_country |
|---|---|---|---|
| 001 | factory1 | 10 | country2 |
| 002 | factory2 | 100 | country5 |
| .... | .... | .... | .... | whether or not the data address set exists in the first storage device.

14 Claims, 23 Drawing Sheets

(51) Int. Cl.
*G06F 16/2453* (2019.01)
*G06F 16/245* (2019.01)

(58) Field of Classification Search
USPC .......................................................... 707/769
See application file for complete search history.

(56) References Cited

FOREIGN PATENT DOCUMENTS

| | | | | |
|---|---|---|---|---|
| JP | 2008-234495 A | | 10/2008 | |
| JP | WO-2012026140 | * | 8/2010 | ....... G06F 17/30463 |
| JP | 2012/026140 | * | 1/2012 | ............. G06F 17/30 |
| WO | 2012/026140 A1 | | 3/2012 | |

OTHER PUBLICATIONS

Harizopoulos, Stavros: QPipe: A simultaneously Pipelined Relational Query Engine; 2005, pp. 383-394, ISBN: 978-59593-060-6 (Year: 2005).*

Kitsuregawa et al., "Vision and preliminary experiments for out-of-order database engine (OoODE)", Database Society of Japan Ronbunshi, Jun. 26, 2009, pp. 131-136, vol. 8, No. 1.

\* cited by examiner

Fig. 1

Table A

| A_factory_id | A_factory_name | A_factory_size | A_country |
|---|---|---|---|
| 001 | factory1 | 10 | country2 |
| 002 | factory2 | 100 | country5 |
| .... | .... | .... | .... |

Fig. 2

Table B

| B_product_id | B_product_name | B_product_price | B_factory_id |
|---|---|---|---|
| 0001 | product1 | 50 | 002 |
| 0002 | product2 | 1000 | 009 |
| 0003 | product3 | 200 | 003 |
| .... | .... | .... | .... |

Fig. 3

Table C

| C_order_id | C_product_id | C_count |
|---|---|---|
| 00000001 | 0002 | 100 |
| 00000002 | 0010 | 50 |
| 00000003 | 0001 | 500 |
| 00000004 | 0005 | 10 |
| 00000005 | 0002 | 350 |
| 00000006 | 0009 | 200 |
| 00000007 | 0001 | 100 |
| 00000008 | 0002 | 500 |
| .... | .... | .... |

Fig. 4

Query

```
SELECT  A_factory_name, B_product_name,
        sum(C_count)
FROM    A, B, C
WHERE   A_country = country5
   AND  A_factory_size > 50
   AND  A_factory_id = B_factory_id
   AND  B_product_price > 500
   AND  B_product_id = C_product_id
GROUP BY A_factory_name, B_product_name
```

Fig. 12

| Buffer ID | Page ID |
|---|---|
| buff1 | pageID a11 |
| buff2 | — |
| buff3 | — |
| buff4 | pageID a23 |
| ... | ... |

Fig. 24

| Task start information ID | Data address set storage location | Main storage expulsion capability |
|---|---|---|
| taskseed1 | Main storage | Capable |
| taskseed2 | Secondary storage | — |
| taskseed3 | Main storage | Incapable |
| ... | ... | |

DATABASE MANAGEMENT SYSTEM, COMPUTER, AND DATABASE MANAGEMENT METHOD

TECHNICAL FIELD

This invention relates to a database management technique.

BACKGROUND ART

In business activities, the use of business data generated in a large amount becomes essential. Therefore, a system which performs an analysis process on a database (hereinafter, referred to as a "DB") where a large amount of the business data is stored has been already contrived.

In the analysis process, a database management system (hereinafter, referred to as a "DBMS") receives a query and issues a data read request to a storage device storing the DB.

As a technique for of reducing latency for data read in an execution of one query, a technique disclosed in PTL 1 is known. According to PTL 1, a DBMS generates a plan (hereinafter, referred to as a "query execution plan") which is a combination of a plurality of database operations (hereinafter, referred to as "DB operations") necessary for executing a query, dynamically generates tasks of executing the DB operations every time of reading data necessary for the query execution, and multiplexes data read requests by executing the tasks in parallel.

CITATION LIST

Patent Literature

[PTL 1]
Japanese Patent Application Publication No. 2007-34414

SUMMARY OF INVENTION

Technical Problem

On the other hand, a method where, when a DBMS dynamically generates tasks every time of reading data necessary for query execution and executes the tasks in parallel, the DBMS generates task start information which is information representing contents of execution of the tasks, generates tasks of which the number is the number of tasks which are generatable at this time, and executes the generated tasks based on the generated task start information is considered. Herein, for example, the task start information is configured so that a context and a data address set are in correspondence with each other. The context denotes, for example, information including first information as to whether or not a DB operation of starting executing a newly generated task is one of one or more DB operations represented by a query execution plan, second information on an access destination for data necessary for the DB operation represented by the first information, and third information on acquisition-completed data necessary for generating a result. Herein, the query execution plan denotes information including information representing one or more DB operations necessary for executing a query. The data address set denotes information for identifying pages which the DBMS accesses at the time of executing the generated task based on the second information on the access destination for the data. For example, the data address set is data stored in pages of a DB and is a set of one or more entries identifying pages of an index corresponding to a key or a set of one or more entries identifying pages storing records of a table corresponding to the key. At the time of starting executing a task, the DBMS identifies a page which is to be read by referring to the task start information, reads the corresponding page, and executes the DB operation by using data stored in the read page.

When the DBMS refers to the task start information at the time of starting executing the task, the DBMS refers to the data address set of the task start information. Every time of referring to the page stored in the storage device, the DBMS reads the page to a memory of a computer operated by the DBMS. However, generally, a storage capacity of the memory of the computer operated by the DBMS is smaller than that of the storage device where the DB is stored. Therefore, the pages which are simultaneously storable in the memory are limited to a portion of the pages which are stored in the storage device. Accordingly, when the DBMS executes the query, a large number of the task start information are generated. However, it is difficult to store the pages storing all the data address sets in the memory.

With respect to this problem, in the case where an amount of free space of the memory is insufficient so that the pages storing the data address sets is not storable in the memory, there is a method of increasing the amount of free space of the memory by temporarily expelling the pages stored in the memory to a disk of a computer or a storage device. In the method, when the DBMS refers to the pages expelled to the disk, the DBMS needs to read the corresponding pages into the memory again. In this manner, in case of using the method of temporarily expelling the pages to the disk, when the DBMS refers to the task start information, since a disk access for reading the pages storing the data address sets of the task start information into the memory occurs, the start of the process of the task is delayed. Accordingly, there is a problem in that the processing time is prolonged. Particularly, in case of multiplexing I/O and executing the DB operations, since latency of the I/O is increased, the influence of the above problem is increased.

Therefore, an object of this invention is to efficiently perform execution of a task and to shorten a query execution time by reducing the number of times of referring to a page stored in a disk when a DBMS refers to task start information.

Solution to Problem

A DBMS manages a database existing in a second storage device of which access speed is lower than that of a first storage device.

The DBMS is configured to include a query reception unit, a query execution plan generation unit, a query execution unit, an executing task management unit, and a DB buffer management unit. For example, the DBMS is a computer program which is executed by the computer, and the query reception unit, the query execution plan generation unit, the query execution unit, the executing task management unit, and the DB buffer management unit are installed in the computer.

The query reception unit receives a query. The query execution plan generation unit generates a query execution plan including information representing one or more DB operations necessary for executing the query. The executing task management unit manages a task for executing the query.

In the execution of the query, the query execution unit dynamically generates the task for executing the DB operation and executes the dynamically generated task. More specifically, for example, in the execution of the query, the query execution unit performs (a) generating the task for executing the DB operation, (b) issuing a data read request to the DB to read data necessary for the DB operation corresponding to the task by executing the generated task, (c) in case of executing an (N+1)th DB operation based on a result of the execution of the N-th DB operation corresponding to the task executed in the (b), generating a new task based on the result of the execution (N is an integer of 1 or more), and (d) performing the (b) and the (c) on the newly generated task; and in the (b) and the (d), in the case where two or more executable tasks exist, the query execution unit executes at least two tasks among the two or more tasks in parallel. Operations of the query execution unit may be operations according to the technique disclosed in PTL 1 described above.

In the execution of the query, in the case where the query execution unit newly generates the task (for example, the case of the (a) or the (c)), the query execution unit generates task start information representing a content of the performed execution of the task and manages the task start information. In case of starting executing the task, the query execution unit selects the task start information representing that the pages storing the data address sets are read into the first storage device prior to the task start information representing that the pages storing the data address sets are stored in only the second storage device and starts executing the content represented by the corresponding task start information as a task.

In the execution of the query, the DB buffer management unit controls movement of the pages between the first storage device and the second storage device according to an execution state of the task start information managed by the query execution unit.

Advantageous Effects of Invention

When the DBMS refers to task start information, it is possible to efficiently perform execution of a task by reducing the number of times of referring to a page stored in a disk, so that it is possible to expect a query execution time to be shortened.

BRIEF DESCRIPTION OF DRAWINGS

FIG. 1 illustrates a table A according to Embodiment 1.
FIG. 2 illustrates a table B according to Embodiment 1.
FIG. 3 illustrates a table C according to Embodiment 1.
FIG. 4 illustrates a query according to Embodiment 1.
FIG. 12 illustrates a configuration of a DB buffer management table according to Embodiment 1.
FIG. 24 illustrates a configuration of a task start information storage location management table according to Embodiment 2.

DESCRIPTION OF EMBODIMENTS

Figure 5:
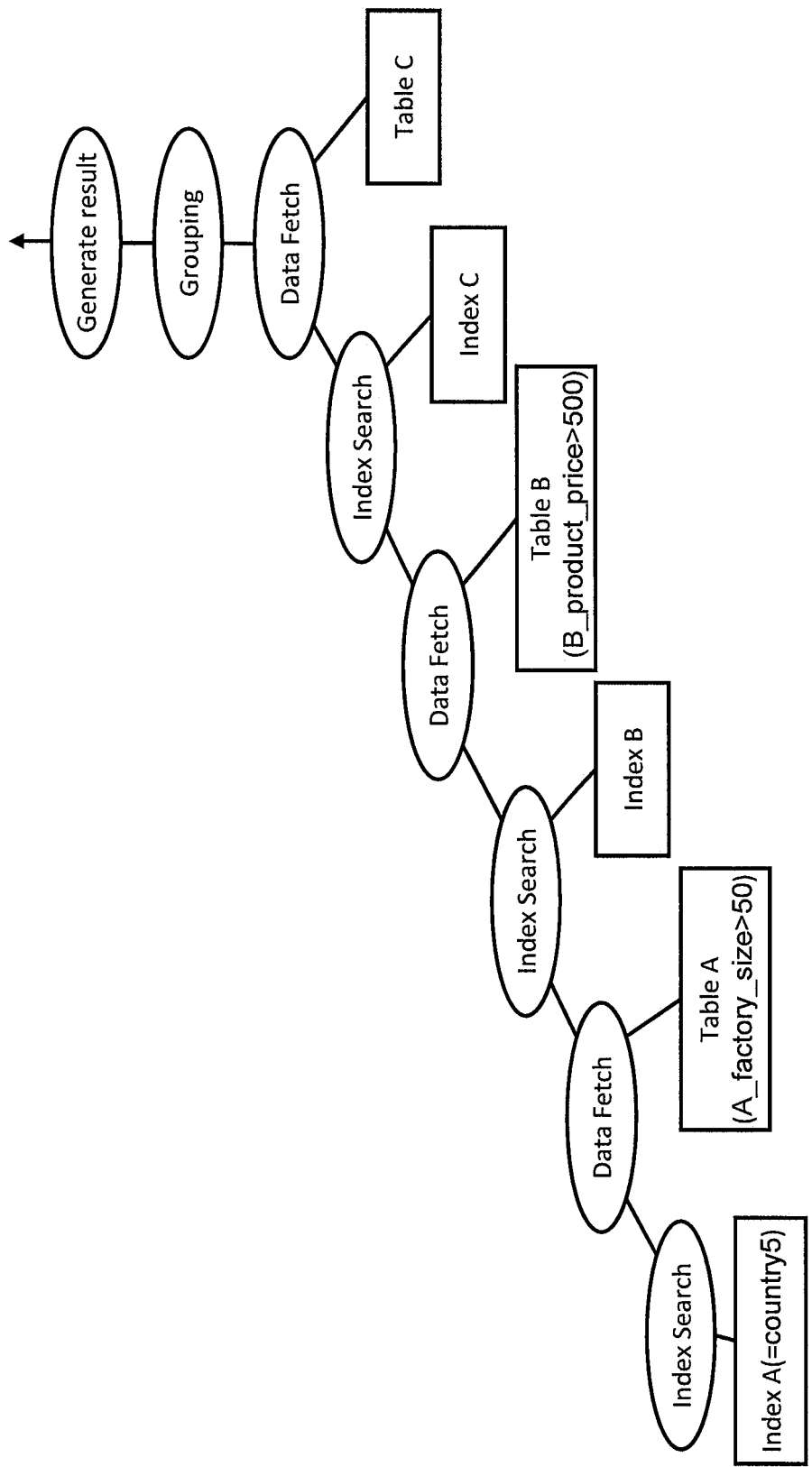
FIG. 5 illustrates a query execution plan according to Embodiment 1.

Hereinafter, several embodiments will be described with reference to the drawings. In addition, this invention is not limited by the description hereinafter mentioned. In addition, in the description hereinafter mentioned, a database is referred to as a "DB"; a database management system is referred to as a "DBMS"; and a server running the DBMS is referred to as a "DB server". A query issuing source which issues a query to the DBMS may be a computer program (for example, an application program) outside the DBMS. The external computer program may be a program which is executed inside the DB server, or the external computer program may be a program which is executed by an apparatus (for example, a client computer) coupled to the DB server.

Embodiment 1

First, the outline of the embodiment will be described.

A DB server runs a DBMS. The DBMS receives a query, executes the received query, and returns a result generated by the execution to a query issuing source for the query. By the time the result of the query is generated, the DBMS executes one or more DB operations. In the execution of at least one DB operation among the DB operations, in some cases, the DBMS needs to issue a read request to a storage device where a DB is stored.

For example, the DBMS stores a DB including a table A, a table B, a table C, an index A for the table A, an index B for the table B, and an index C for the table C illustrated in FIGS. 1 to 3 in a storage device (for example, an external storage apparatus communicatably coupled to the DB server). Each table is a set of one or more records, and a record is configured with one or more columns. Each index is a data structure which is produced by defining one or more columns as objects in each table and increases a speed of accessing the table according to a selection condition that the columns as the objects defined by the index are included. For example, the index is a data structure which retains information (record IDs) identifying records of the table including each of values of the columns defined as the objects for each value, and a B-tree structure or the like is used.

In addition, for example, the query received by the DBMS is the query illustrated in FIG. 4. The query makes a correspondence among records of the table A where values of a column A_country are "country5" and values of a column A_factory_size are larger than 50, records of the table B where values of a column B_factory_id are coincident with values of a column A_factory_id of the records of the table A and values of a column B_product_price are larger than 500, and records of the table C where values of a column C_product_id are coincident with values of a column B_product_id of the records of the table B. In addition, in the query, these records are grouped by values of a column A_factory_name and values of a column B_product_name, and a total sum of the values of the column A_factory_name, the values of the B_product_name, and values of a column C_count for respective groups is extracted.

In order to execute the query, the DBMS generates a query execution plan illustrated in FIG. 5. The query execution plan is configured with one or more DB operations associated with, for example, data read, and a sequence relationship having a tree structure exists in the execution sequence of the DB operations. The DBMS reads records where the values of the column A_country are the designated values (country5 in the query of FIG. 4) of the query from the table A by using the index A based on the query execution plan and extracts the values of the column A_factory_name and the values of the column A_factory_id in the records where the values of the column A_factory_size are larger than the designated values (50 in the query of FIG. 4) of the query among the records. In addition, the DBMS reads records where the values of the column B_factory_id are coincident with the extracted values of the A_factory_id from the table B by using the index B and extracts the values of the column B_product_name and the values of the column B_product_id in the records where the values of the column B_product_price are larger than the designated values (500 in the query of FIG. 4) of the query among the records. In addition, the DBMS reads records where the values of the column C_product_id are coincident with the extracted values of the column B_product_id from the table C by using the index C, extracts the values of the column C_count for the records, groups the values of the column C_count based on the extracted values of the column A_factory_name and the extracted values of the column B_product_name, and calculates a total sum of the values of the column C_count for the respective groups. As a result of the query execution, the DBMS generates the values of the column A_factory_name, the values of the column B_product_name, and the calculated total sum of the column C_count for each group as a result of the execution of the query.

For example, the DBMS performs the following processes of:

(S1) searching for a set of record IDs corresponding to the records of the table A where the values of the column A_country are the designated values of the query by using the index A;

(S2) fetching data including the corresponding records of the table A by using the record ID set searched in S1 and extracting the values of the column A_factory_name and the values of the column A_factory_id of the records where the values of the column A_factory_size are larger than the designated values of 50 of the query;

(S3) searching for a record ID set of the records of the table B where the values of the value of the column B_factory_id are coincident with the values of the column A_factory_id extracted in S2 by using the index B;

(S4) fetching data including the corresponding records of the table B by using the record ID set searched in S3 and extracting the values of the column B_product_id and the values of the column B_product_name of the records where the values of the column B_product_price are larger than the designated values of 500 of the query;

(S5) searching for a record ID set of the records of the table C where the values of the column C_product_id are coincident with the values of the column B_product_id extracted in S4 by using the index C;

(S6) fetching data including the corresponding records of the table C by using the record ID set searched in S5 and extracting the values of the column C_count of the corresponding records;

(S7) grouping the values of the column C_count by the extracted values of the column A_factory_name and the extracted values of the column B_product_name and calculating a total sum of the values of the column C_count for each group; and (S8) generating the extracted values of the column A_factory_name, the extracted values of the column B_product_name, and the total sum of the values of the column C_count calculated in S7 as a result of the execution of the query and returning the result of the execution of the query to the query issuing source.

Figure 6:
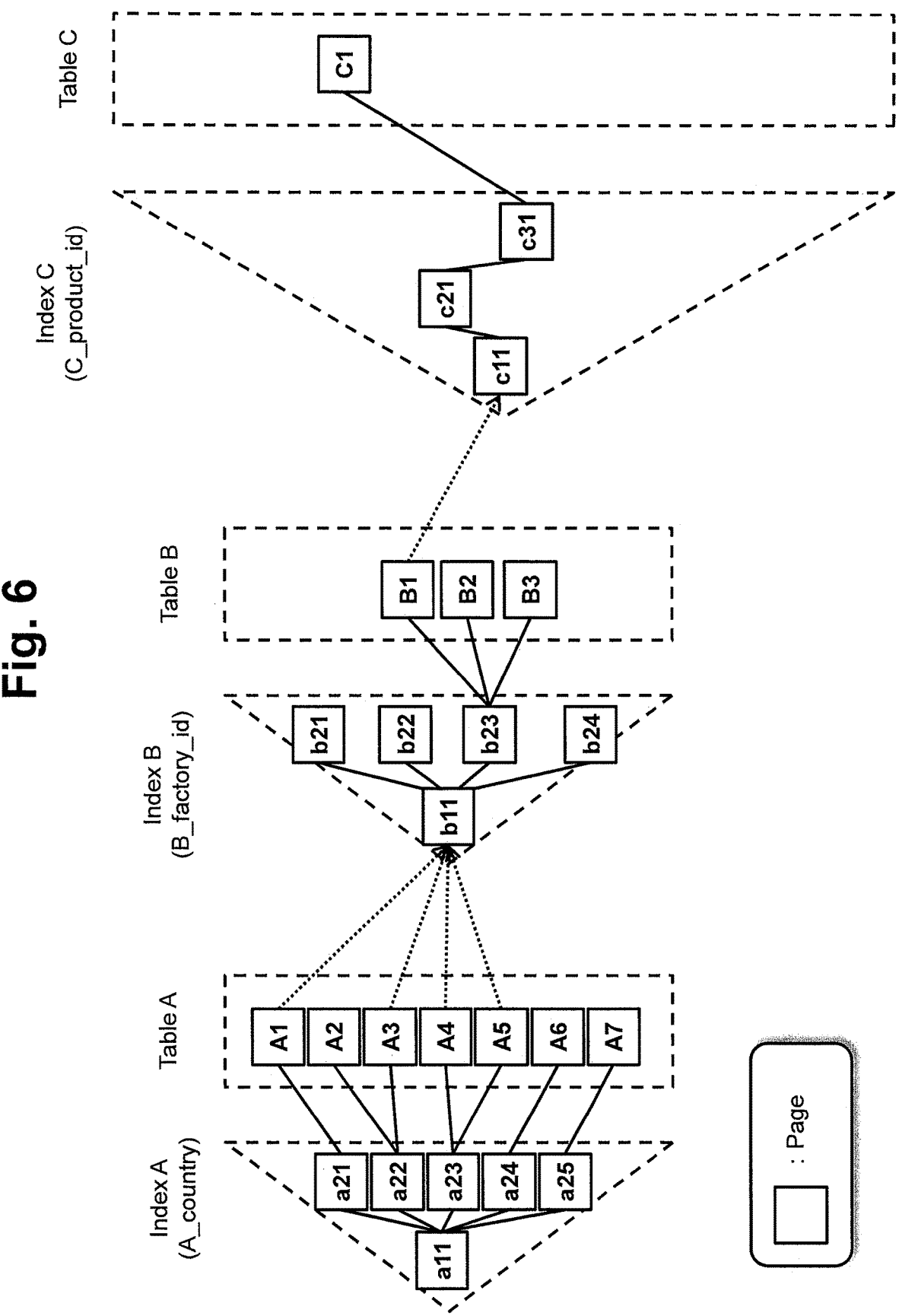
FIG. 6 illustrates an example of an access to pages at the time of query execution according to Embodiment 1.

FIG. 6 illustrates an example of an access to pages at the time of query execution according to Embodiment 1.

FIG. 6 illustrates an example of an access to pages of indices and tables of the DB when the DBMS executes a query according to the query execution plan illustrated in FIG. 5. Herein, a page denotes a unit of data management in the DBMS, data read from the DB and data writ-in to the DB are performed in units of a page by the DBMS. The page stores, for example, one or more entries including information (page IDs) identifying lower pages in the index or one or more entries including information (record IDs) identifying records of a corresponding table. In addition, the information identifying records includes information identifying pages where the records are stored.

At the time of executing a query according to the query execution plan illustrated in FIG. 5, first, the DBMS accesses a page a11. The DBMS accesses lower pages a21 to a25 based on the entries of the page a11.

The DBMS accesses a page A1 of the table A based on the entries of the page a21, accesses a page A2 and a page A3 of the table A based on the entries of the page a22, accesses a page A4 and a page A5 of the table A based on the entries of the page a23, accesses a page A6 of the table A based on the entries of the page a24, and accesses a page A7 of the table A based on the entries of the page a25.

In addition, the DBMS accesses a page b11 of the index B based on the records stored in the page A1, accesses the page b11 of the index B based on the records stored in the page A3, accesses the page b11 of the index B based on the records stored in the page A4, and accesses the page b11 of the index B based on the records stored in the page A5. In addition, like the page A2, if a page is not used for accessing the page of the index B, it denotes that no record which is in accordance with the condition designated by the query is stored.

In addition, the DBMS accesses a page b21 based on the records stored in the page A1 and the entries of the page b11 of the index B, accesses a page b22 based on the records stored in the page A3 and the entries of the page b11, accesses a page b23 based on the records stored in the page A4 and the entries of the page b11, and accesses a page b24 based on the records stored in the page A5 and the entries of the page b11.

In addition, the DBMS accesses pages B1 to B3 of the table B based on the records stored in the page A4 and the entries of the page b23 of the index B. The DBMS accesses a page c11 of the index C based on the records stored in the page B1 of the table B. In addition, the DBMS accesses a page c21 based on the records stored in the page B1 and the entries of the page c11 of the index C and accesses a page c31 based on the records stored in the page B1 and the entries of the page c21. In addition, the DBMS accesses a page C1 of the table C based on the records stored in the page B1 and the entries of the page c31 of the index C.

Figure 7:
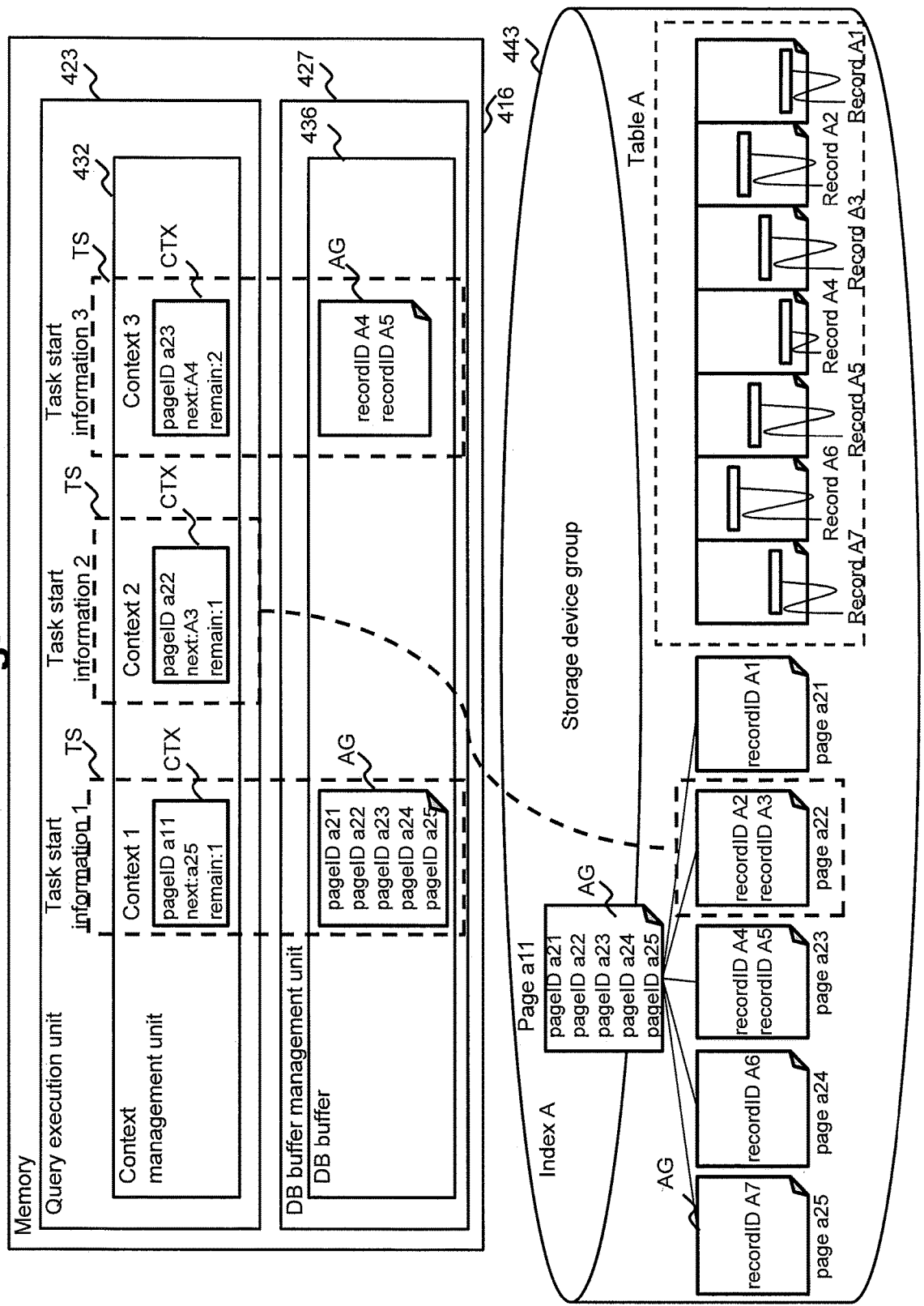
FIG. 7 is a diagram illustrating task start information according to Embodiment 1.

FIG. 7 is a diagram illustrating the task start information according to Embodiment 1.

When the DBMS starts executing the task, the DBMS identifies the page which is to be accessed by the executed DB operation by referring to the task start information TS.

The task start information TS is information representing a content of the performed execution of the task. For example, the task start information is configured so that a context CTX and a data address set AG are in correspondence with each other. The context CTX denotes, for example, information including first information as to whether or not a DB operation of starting executing a newly generated task is one of one or more DB operations represented by a query execution plan, second information on an access destination for data necessary for the DB operation represented by the first information, and third information on acquisition-completed data necessary for generating a result. The data address set AG denotes information for identifying pages which the DBMS accesses at the time of executing the generated task based on the second information on the access destination for the data. For example, the data address set AG is data stored in pages of a DB 451 and is a set of one or more entries identifying pages of an index corresponding to a key or a set of one or more entries identifying pages storing records of a table corresponding to the key.

Every time when a page of a storage device group 443 of an external storage apparatus 402 is accessed, the page is read from the storage device group 443 to a DB buffer 436 by a DBMS 412. The storage capacity of the DB buffer 436 is smaller than the storage capacity of the memory 416, and generally, the storage capacity of the memory 416 is smaller than the storage capacity of the storage device group 443. Therefore, the pages which are simultaneously storable in the DB buffer 436 are a portion of the pages which are storable in the storage device group 443. In the figure, for example, the page storing the data address set AG of the task start information 1 and the page storing the data address set AG of the task start information 3 are read from the storage device group 443 and are stored in the DB buffer 436; and the page storing the data address set AG of the task start information 2 is not stored in the DB buffer 436 and is stored in only the storage device group 443.

The context CTX stores information (for example, a page ID) identifying the page storing the data address set AG, information representing entries which are to be accessed by the task of which execution is started next among the entries of the data address set AG, and the number (the number of generatable tasks) of remaining entries which are to be accessed by the further execution of the task. The context CTX is managed by a context management unit 432 of a query execution unit 423.

Figure 8:
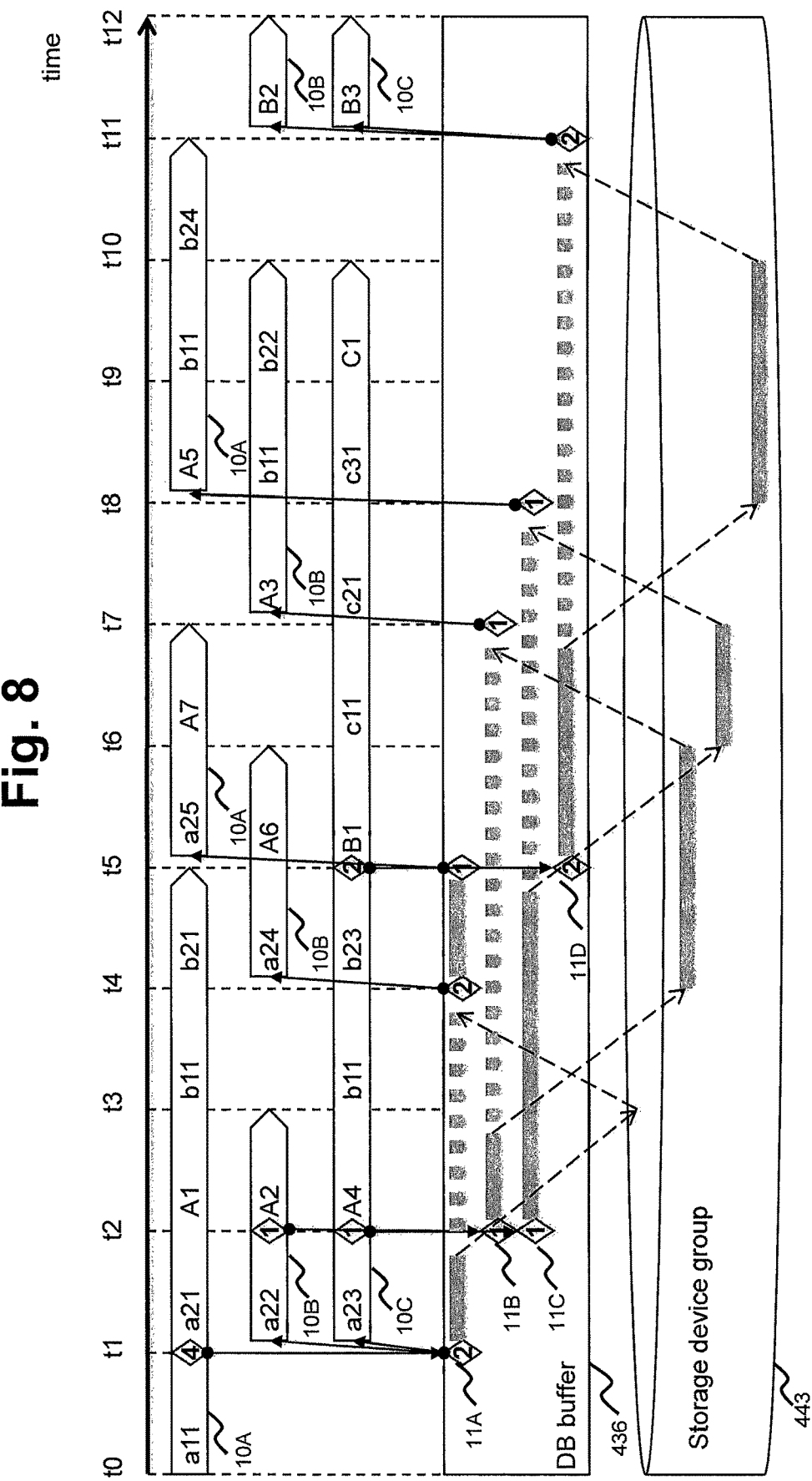
FIG. 8 is an example of a schematic diagram illustrating execution of a task and management of task start information at the time of query execution.

FIG. 8 is an example of a schematic diagram illustrating execution of a task and management of task start information at the time of query execution by the DBMS. FIG. 8 illustrates the execution of the task and the management of the task start information in the example of the access illustrated in FIG. 6. In addition, the notation of FIG. 8 is in accordance with the following rules.

(*) The horizontal axis represents a time.

(*) Each of horizontally-elongated pentagons in the upper portion of the figure denotes a series of DB operations by one task. The left end of the pentagon represents a time when the DB operation by the task is started, and the right end of the pentagon represents a time when the DB operation by the task is ended.

(*) The value inside of each of the pentagons in the upper portion of the figure represents information (for example, a page ID) representing the page of the index which the task accesses according to the execution of the DB operation or information (for example, a record ID) representing the record of the table.

(*) The number of simultaneously executable tasks is set to "3".

(*) Each diamond in the figure represents the data address set AG of the task start information TS. The number in each diamond represents the number of generatable tasks included in the context CTX of the task start information TS. In addition, the position of the diamond inside each of the pentagons in the upper portion of the figure represents a time when the task start information TS including the data address set AG is generated.

(*) In the DB buffer 436 of the figure, bold solid lines following diamonds represent that the pages storing the data address sets AG are stored in the DB buffer 436, and bold broken lines represent that the pages storing the data address sets AG are not stored in the DB buffer 436.

(*) The upper limit of the number of pages which are simultaneously storable in the DB buffer 436 is set to "2".

(*) Broken arrows from the DB buffer 436 to the storage device group 443 represent expulsion of the pages from the DB buffer 436 to the storage device group 443, and broken arrows from the storage device group 443 to the DB buffer 436 represent page read from the storage device group 443 to the DB buffer 436. In addition, in the case where the page as an expulsion-object is not a dirty page (page storing data different from the data of the page stored in the storage device group 443), the DBMS may not move the page into the storage device group 443 but remove the page from the DB buffer.

(*) An access speed of the storage device group 443 is lower than that of the memory 416 retaining the DB buffer 436. In addition, a high/low access speed may denote a large/small amount of data input or output per unit time, or a high/low access speed may be a short/long response time from the time when an access request is issued from an access source (DBMS) to the time when a response to the access request is returned to the access source (DBMS). Therefore, for example, although the memory 416 is a nonvolatile semiconductor memory and each storage device constituting the storage device group 443 is also a nonvolatile semiconductor memory having the same access speed, in the case where the storage device group 443 exists in an external storage apparatus, since the access speed is influenced by a network transmission speed, the access speed of the storage device group 443 is lower than that of the memory 416.

(t0)

The DBMS generates a task 10A by execution of the task 10A and accesses the page a11 of the index A on the storage device group 443. In addition, when the DBMS accesses the page, in the case where the access-object page is stored in the DB buffer 436, the DBMS refers to the page stored in the corresponding DB buffer 436; and in the case where the access-object page is not stored in the DB buffer 436, the DBMS reads the page from the storage device group 443 into the DB buffer 436 and refers to the page stored in the DB buffer 436.

(t1)

By execution of the task 10A, the DBMS identifies the to-be-accessed lower pages as a21 to a25 based on the designated values of the query and the entries of the page a11 and generates the task start information. Namely, the DBMS generates a context and makes a correspondence between the page a11 where the addresses of the pages a21 to a25 identified to be accessed are stored as the data address set 11A and the generated context. Since the upper limit of the number of pages which are simultaneously storable in the DB buffer is 2 and, at this time, the number of accessed pages is 1, the data address set 11A is on the DB buffer. In addition, the DBMS sets the next to-be-accessed entry as a22 with respect to the context, and sets the number of generatable tasks to 4. Accordingly, the task start information is completed as a set of the data address set 11A and the context which is in correspondence with the data address set 11A.

Subsequently, by execution of the task 10A, the DBMS accesses the page a21.

In addition, since the number of simultaneously executable tasks is "3" and the number of executing tasks is "1" (only the task 10A is being executed), the number of executable tasks is "2" by subtracting "1" from "3". Therefore, the DBMS generates two tasks 10B and 10C.

In addition, by execution of the task 10B, the DBMS starts executing one task by referring to the task start information. Namely, the DBMS identifies the next to-be-accessed entry as a22 by referring to the context which is in correspondence with the data address set 11A and changes the next to-be-accessed entry into the next page a23. Next, the DBMS changes the number of generatable tasks into 3 by subtracting 1, fetches the address of the page a22 by referring to the data address set 11A, and accesses the page a22 based on the fetched address.

In addition, by execution of the task 10C, the DBMS starts executing one task by referring to the task start information. Namely, the DBMS identifies the next to-be-accessed entry as a23 by referring to the context which is in correspondence with the data address set 11A and changes the next to-be-accessed entry into the next page a24. Next, the DBMS changes the number of generatable tasks into 2 by subtracting 1, fetches the address of the page a23 by referring to the data address set 11A, and accesses the page a23 based on the fetched address.

(t2)

By execution of the task 10A, the DBMS identifies the to-be-accessed record as A1 based on the designated values of the query and the entries of the page a21, fetches the address of the record A1 by referring to the page a21, and accesses the page A1 based on the fetched address. In addition, by execution of the task 10B, the DBMS identifies the to-be-accessed records A2 and A3 based on the designated values of the query and the entries of the page a22 and generates the task start information. Namely, the DBMS generates a context and makes a correspondence between the page a22 where the addresses of the pages A2 to A3 identified to be accessed are stored as the data address set 11B and the generated context, sets the next to-be-accessed entry as A3 with respect to the context, and sets the number of generatable tasks to 1. Accordingly, the task start information is completed as a set of the data address set 11B and the context which is in correspondence with the data address set 11B. Subsequently, by execution of the task 10B, the DBMS accesses the page A2.

In addition, by execution of the task 10C, the DBMS identifies the to-be-accessed records A4 and A5 based on the designated values of the query and the entries of the page a23 and generates the task start information. Namely, the DBMS generates a context and makes a correspondence between the page a23 where the addresses of the pages A4 to A5 identified to be accessed are stored as the data address set 11C and the generated context, sets the next to-be-accessed entry as A5 with respect to the context, and sets the number of generatable tasks to 1. Accordingly, the task start information is completed as a set of the data address set 11C and the context which is in correspondence with the data address set 11C. Subsequently, by execution of the task 10C, the DBMS accesses the page A4.

The DBMS stores the page storing the data address set 11B and the page storing the data address set 11C in the DB buffer 436. Therefore, the number of pages which are simultaneously storable in the DB buffer 436 is "2". Therefore, before the DBMS stores at least one of the pages storing the data address sets 11B and 11C in the DB buffer 436, the DBMS expels the page storing the oldest data address set 11A (data address set which is initially stored in the DB buffer 436 among the data address sets stored in the DB buffer 436) on the DB buffer 436 to the storage device group 443. In addition, since the page a21 accessed in t1 is also stored in the buffer, the page a21 can affect the behavior described above. In order to describe the main points of the prevent invention in brief in FIG. 8, in the assumption that the page a21 is temporarily stored in the DB buffer and, after the A1 is identified, the page a21 is immediately expelled to the storage device group 443, the description is made. However, this invention is not limited to the assumption as described later.

(t3)

By execution of the task 10A, the DBMS determines that the record A1 satisfies the condition designated by the query, identifies the search condition of the index B based on the corresponding record, and accesses the page b11 of the index B.

In addition, by execution of the task 10B, the DBMS determines that the records A2 does not satisfy the condition designated by the query. Subsequently, in order to execute the task, the DBMS refers to an initially-generated task start information (task start information configured with a data address set 11A and a context which is in correspondence with the data address set 11A). Namely, the DBMS identifies the next to-be-accessed entry as a24 by referring to the context which is in correspondence with the data address set 11A, changes the next to-be-accessed entry into the next page a25, changes the number of generatable tasks into 1 by subtracting 1, and tries to fetch the address of the page a24 by referring to the data address set 11A. However, the data address set 11A in t2 is expelled to the storage device group 443, and thus, the data address set 11A does not exist on the DB buffer 436. Therefore, the DBMS performs the process of reading the page storing the data address set 11A from the storage device group 443 into the DB buffer 436. Accordingly, the task 103 waits for the page storing the data address set 11A to be read into the memory 416. Herein, if the DBMS reads the page storing the data address set 11A into the DB buffer 436, the number of pages which are stored in the DB buffer 436 exceeds the number of storable pages "3". Therefore, the DBMS expels the page storing the oldest data address set 11B on the DB buffer 436 to the storage device group 443.

In addition, by execution of the task 10C, the DBMS determines that the record A4 satisfies the condition designated by the query, identifies the search condition of the index B based on the corresponding record, and accesses the page b11 of the index B.

(t4)

By execution of the task 10A, the DBMS identifies the to-be-accessed lower page as b21 based on the search condition of the index B identified in t3 and the entries of the page b11, fetches the address of the page b21 by referring to the page b11, and accesses the page b21 based on the fetched address.

In addition, by execution of the task 10B, the DBMS fetches the address of the page a24 by referring to the data address set 11A on which the process of reading from the storage device group 443 into the DB buffer 436 in t3 is performed and accesses the page a24 based on the fetched address.

In addition, by execution of the task 10C, the DBMS identifies the to-be-accessed lower page as b23 based on the search condition of the index B identified in t3 and the entries of the page b11, fetches the address of the page b23 by referring to the page b11, and accesses the page b23 based on the fetched address.

(t5)

By execution of the task 10A, the DBMS determines based on the search condition of the index B identified in t3 and the entries of the page b21 that the to-be-accessed lower page does not exist. Subsequently, in order to execute the task, the DBMS refers to an initially-generated task start information (task start information configured with a data address set 11A and a context which is in correspondence with the data address set 11A). Namely, the DBMS identifies the next to-be-accessed entry as a25 by referring to the context which is in correspondence with the data address set 11A, checks the number of generatable tasks to be 0 by subtracting 1, fetches the address of the page a25 by referring to the data address set 11A, erases the corresponding task start information, and accesses the page a25 based on the fetched address. In addition, by execution of the task 10B, the DBMS identifies the to-be-accessed record as A6 based on the designated values of the query and the entries of the page a24, fetches the address of the record A6 by referring to the page a24, and accesses the page A6 based on the fetched address.

In addition, by execution of the task 10C, the DBMS identifies the to-be-accessed records as B1 to B3 based on the search condition of the index B identified in t3 and the entries of the page b23 and generates the task start information. Namely, the DBMS generates a context and makes a correspondence between the page b23 where the addresses of the pages B1 to B3 identified to be accessed are stored as the data address set 11D and the generated context, sets the next to-be-accessed entry as B2 with respect to the context, and sets the number of generatable tasks to 2. Accordingly, the task start information is completed as a set of the data address set 11D and the context which is in correspondence with the data address set 11D. Subsequently, by execution of the task 10C, the DBMS accesses the page B1.

Herein, the DBMS stores the page storing the data address set 11D into the DB buffer 436. However, at this time, the page storing the data address sets 11A and 11C are stored in the DB buffer 436, and thus, the number of pages which are storable in the DB buffer 436 is "2". Therefore, before the DBMS stores the page storing the data address set 11D in the DB buffer 436, the DBMS expels the page storing the oldest, non-referenced data address set 11C on the DB buffer 436 to the storage device group 443.

(t6)

By execution of the task 10A, the DBMS identifies the to-be-accessed record as A7 based on the designated values of the query and the entries of the page a25, fetches the address of the record A7 by referring to the page a25, and accesses the page A7 based on the fetched address. In addition, by execution of the task 10B, the DBMS determines that the record A6 does not satisfy the condition designated by the query. Subsequently, in order to execute the task, the DBMS refers to an initially-generated task start information (task start information configured with a data address set 11B and a context which is in correspondence with the data address set 11B) among a plurality of task start information where the number of generatable tasks is one or more. Namely, the DBMS identifies the next to-be-accessed entry as A3 by referring to the context which is in correspondence with the data address set 11B, checks the number of generatable tasks to be 0 by subtracting 1, and tries to fetch the address of the page A3 by referring to the data address set 11B. However, the page storing the data address set 11B in t3 is expelled to the storage device group 443, and thus, the page does not exist on the DB buffer 436. Therefore, the DBMS performs the process of reading the page storing the data address set 11B from the storage device group 443 into the DB buffer 436. Accordingly, the task 103 waits for the page storing the data address set 11B to be read into the DB buffer 436.

In addition, by execution of the task 10C, the DBMS determines that the record B1 satisfies the condition designated by the query, identifies the search condition of the index C based on the corresponding record, and accesses the page c11 of the index C.

(t7)

By execution of the task 10A, the DBMS determines that the record A7 does not satisfy the condition designated by the query. Subsequently, in order to execute the task, the DBMS refers to an initially-generated task start information (task start information configured with a data address set 11C and a context which is in correspondence with the data address set 11C) among the plurality of the task start information where the number of generatable tasks is one or more. Namely, the DBMS identifies the next to-be-accessed entry as A5 by referring to the context which is in correspondence with the data address set 11C, checks the number of generatable tasks to be 0 by subtracting 1, and tries to fetch the address of the page A5 by referring to the data address set 11C. However, the page storing the data address set 11C in t5 is expelled to the storage device group 443, and thus, the page does not exist on the DB buffer 436. Therefore, the DBMS performs the process of reading the page storing the data address set 11C from the storage device group 443 into the DB buffer 436. Accordingly, the task 10A waits for the page storing the data address set 11C to be read into the DB buffer 436. Herein, the DBMS reads the page storing the data address set 11C into the DB buffer 436. However, at this time, the page storing the data address sets 11B and 11D are stored in the DB buffer 436, and thus, the number of pages which are storable in the DB buffer 436 is "2". Therefore, the DBMS expels the page storing the oldest, non-referenced data address set 11D on the DB buffer 436 to the storage device group 443.

In addition, by execution of the task 10B, the DBMS fetches the address of the page A3 by referring to the data address set 11B on which the process of reading from the storage device group 443 into the DB buffer 436 in t6, remove the corresponding task start information in which the number of generatable tasks becomes 0, and accesses the page A3 based on the fetched address.

In addition, by execution of the task 10C, the DBMS identifies the to-be-accessed lower page as c21 based on the search condition of the index C identified in t6 and the entries of the page c11, fetches the address of the page c21 by referring to the page c11, and accesses the page c21 based on the fetched address.

(t8)

By execution of the task 10A, the DBMS fetches the address of the page A5 by referring to the data address set 11C on which the process of reading from the storage device group 443 into the DB buffer 436 in t7, remove the corresponding task start information in which the number of generatable tasks becomes 0, and accesses the page A5 based on the fetched address.

In addition, by execution of the task 10B, the DBMS determines that the record A3 satisfies the condition designated by the query, identifies the search condition of the index B based on the corresponding record, and accesses the page b11 of the index B.

In addition, by execution of the task 10C, the DBMS identifies the to-be-accessed lower page as c31 based on the search condition of the index C identified in t6 and the entries of the page c21, fetches the address of the page c31 by referring to the page c21, and accesses the page c31 based on the fetched address.

(t9)

By execution of the task 10A, the DBMS determines that the record A5 satisfies the condition designated by the query, identifies the search condition of the index B based on the corresponding record, and accesses the page b11 of the index B.

In addition, by execution of the task 10B, the DBMS identifies the to-be-accessed lower page as b22 based on the search condition of the index B identified in t8 and the entries of the page b11, fetches the address of the page b22 by referring to the page b11, and accesses the page b22 based on the fetched address.

In addition, by execution of the task 10C, the DBMS identifies the to-be-accessed record as C1 based on the search condition of the index C identified in t6 and the entries of the page c31, fetches the address of the record C1 by referring to the page c31, and accesses the page C1 based on the fetched address.

(t10)

By execution of the task 10A, the DBMS identifies the to-be-accessed lower page as b24 based on the search condition of the index B identified in t9 and the entries of the page b11, fetches the address of the page b24 by referring to the page b11, and accesses the page b24 based on the fetched address.

In addition, by execution of the task 10B, the DBMS determines based on the search condition of the index B identified in t8 and the entries of the page b22 that the to-be-accessed lower page does not exist. Subsequently, in order to execute the task, the DBMS refers to an initially-generated task start information (task start information configured with a data address set 11D and a context which is in correspondence with the data address set 11D) among the plurality of task start information where the number of generatable tasks is one or more. Namely, the DBMS identifies the next to-be-accessed entry as B2 by referring to the context which is in correspondence with the data address set 11D, changes the next to-be-accessed entry into the next page B3, changes the number of generatable tasks into 1 by subtracting 1, and tries to fetch the address of the page B2 by referring to the data address set 11D. However, the page storing the data address set 11D in t7 is expelled to the storage device group 443, and thus, the page does not exist on the DB buffer 436. Therefore, the DBMS performs the process of reading the page storing the data address set 11D from the storage device group 443 into the DB buffer 436. Accordingly, the task 10B waits for the page storing the data address set 11D to be read into the DB buffer 436.

In addition, by execution of the task 10C, the DBMS determines that the record C1 satisfies the condition designated by the query.

Subsequently, in order to execute the task, the DBMS refers to an initially-generated task start information (task start information configured with a data address set 11D and a context which is in correspondence with the data address set 11D) among the plurality of task start information where the number of generatable tasks is one or more. Namely, the DBMS identifies the next to-be-accessed entry as B3 by referring to the context which is in correspondence with the data address set 11D, checks the number of generatable tasks to be 0 by subtracting 1, and tries to fetch the address of the page B3 by referring to the data address set 11D. However, the page storing the data address set 11D in t7 is expelled to the storage device group 443, and thus, the page does not exist on the DB buffer 436. Therefore, the DBMS performs the process of reading the page storing the data address set 11D from the storage device group 443 into the DB buffer 436. Accordingly, the task 10C waits for the page storing the data address set 11D to be read into the DB buffer 436.

(t11)

By execution of the task 10A, the DBMS determines based on the search condition of the index B identified in t9 and the entries of the page b24 that the to-be-accessed lower page does not exist. Subsequently, in order to execute the task, the DBMS searches for the task start information where the number of generatable tasks is one or more. However, at this time, since there is no task start information where the number of generatable tasks is one or more, the DBMS ends the task 10A.

In addition, by execution of the task 10B, the DBMS fetches the address of the page B2 by referring to the data address set 11D on which the process of reading from the storage device group 443 into the DB buffer 436 in t10 and accesses the page B2 based on the fetched address.

In addition, by execution of the task 10C, the DBMS fetches the address of the page B3 by referring to the data address set 11D on which the process of reading from the storage device group 443 into the DB buffer 436 in t10, remove the corresponding task start information in which the number of generatable tasks becomes 0, and accesses the page B3 based on the fetched address.

(t12)

By execution of the task 10B, the DBMS determines that the record B2 does not satisfy the condition designated by the query. Subsequently, in order to execute the task, the DBMS searches for the task start information where the number of generatable tasks is one or more. However, at this time, since there is no task start information where the number of generatable tasks is one or more, the DBMS ends the task 10B.

In addition, by execution of the task 10C, the DBMS determines that the record B3 does not satisfy the condition designated by the query. Subsequently, in order to execute the task, the DBMS searches for the task start information where the number of generatable tasks is one or more. However, at this time, since there is no task start information where the number of generatable tasks is one or more, the DBMS ends the task 10C.

Through the processes described heretofore, the access processes for the DB are ended, and the query process is ended.

In Embodiment 1, in order to execute the query process more speedily than the query process illustrated in FIG. 8, the DBMS performs execution of the task and management of the task start information, as follows.

Figure 9:
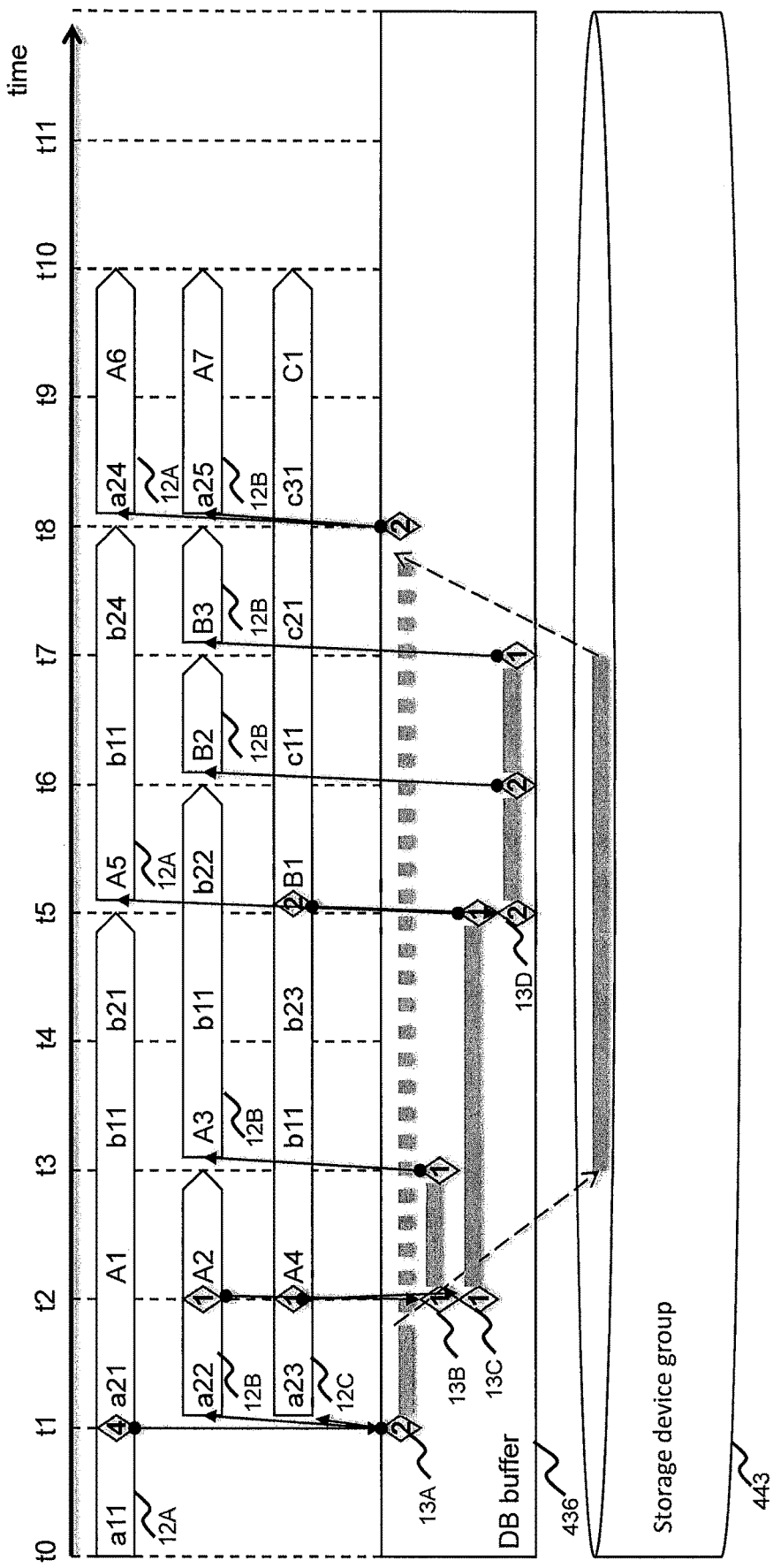
FIG. 9 is an example of a schematic diagram illustrating execution of a task and management of task start information at the time of query execution according to Embodiment 1.

FIG. 9 is an example of a schematic diagram illustrating the execution of the task and the management of the task start information at the time of the query execution according to Embodiment 1. The rules of the notation are the same as those of FIG. 8.

In the (t0) to the (t2), the same processes as those of the (t0) to the (t2) of FIG. 8 are performed except for the points described below. In the (t2), the DBMS expels the pages storing the data address sets from the DB buffer 436 to the storage device group 443. However, herein, in the case where a plurality of the pages storing the data address sets exist in the DB buffer 436, the DBMS does not simply determine the page storing the oldest data address set (data address set initially stored in the DB buffer 436 among the data address sets stored in the DB buffer 436) as an expulsion object, but the DBMS determines the pages storing the data address sets as an expulsion object based on a relative relationship between a generation speed of the task start information (number of task start information generated per unit time) and a consumption speed of the task start information (number of task start information consumed per unit time) and the number of generatable tasks retained in the context of each task start information. More specifically, the DBMS determines the pages storing the data address sets as an expulsion object based on a result of comparison between the generation speed of the task start information and the consumption speed of the task start information. The generation speed and the consumption speed which are to be compared may be the generation speed and the consumption speed in the same time range.

More specifically, in the case where the generation speed of the task start information is higher than the consumption speed of the task start information, the DBMS determines the pages storing the data address sets which are in correspondence with the context where the number of generatable tasks is equal to or larger than a predetermined threshold value as an expulsion object, and the DBMS does not determines the pages storing the data address sets which are in correspondence with the context where the number of generatable tasks is smaller than the predetermined threshold value as an expulsion object. In addition, the threshold value may be a designated fixed value, or the threshold value may be a variable value which is dynamically updated by the DBMS. As a variable value, for example, an average value of the number of generatable tasks of the entire contexts may be calculated, and the DBMS may update with the calculated value at arbitrary timing. In this manner, in the case where the total number of task start information tends to be increased, the DBMS preferentially expels the pages storing the data address sets which are in correspondence with the context of which the number of generatable tasks is large from the DB buffer 436 to the storage device group 443. Accordingly, it is possible to expect the task start information to be efficiently consumed.

In addition, in the case where the generation speed of the task start information is equal to or lower than the consumption speed of the task start information, the DBMS does not determine the pages storing the data address sets which are in correspondence with the context where the number of generatable tasks is equal to or larger than a predetermined threshold value as an expulsion object but determines the pages storing the data address sets which are in correspondence with the context where the number of generatable tasks is smaller than a predetermined threshold value as an expulsion object. In this manner, in the case where the total number of task start information tends to be decreased, the DBMS determines the pages storing the data address sets which are in correspondence with the context where the number of generatable tasks is small as the expulsion object which is preferentially expelled to the storage device group 443, and the DBMS preferentially remains the pages storing the data address sets which are in correspondence with the context where the number of generatable tasks is large in the DB buffer 436. Accordingly, it is possible to expect a large number of the tasks to be efficiently executed.

(t3)

By execution of the task 12A, the DBMS determines that the record A1 satisfies the condition designated by the query, identifies the search condition of the index B based on the corresponding record, and accesses the page b11 of the index B.

In addition, by execution of the task 12B, the DBMS determines that the record A2 does not satisfy the condition designated by the query. Subsequently, in order to execute the task, the DBMS refers to the task start information. Herein, in Embodiment 1, the DBMS preferentially refers to the task start information where the pages storing the data address sets exist in the DB buffer 436. In addition, in the case where there are a plurality of the pages storing the data address sets in the DB buffer 436, the DBMS may preferentially refer to the task start information where the number of generatable tasks retained in the context of the task start information is small. By execution of the task 12B, the DBMS identifies the next to-be-accessed entry as A3 by referring to the context which is in correspondence with the data address set 13B existing in the DB buffer 436, checks the number of generatable tasks to be 0 by subtracting 1, fetches the address of the page A3 by referring to the data address set 13B, remove the corresponding task start information in which the number of generatable tasks becomes 0, and accesses the page A3 based on the fetched address.

In addition, by execution of the task 12C, the DBMS determines that the record A4 satisfies the condition designated by the query, identifies the search condition of the index B based on the corresponding record, and accesses the page b11 of the index B.

(t4)

By execution of the task 12A, the DBMS identifies the to-be-accessed lower page as b21 based on the search condition of the index B identified in t3 and the entries of the page b11, fetches the address of the page b21 by referring to the page b11, and accesses the page b21 based on the fetched address.

In addition, by execution of the task 12B, the DBMS determines that the record A3 satisfies the condition designated by the query, identifies the search condition of the index B based on the corresponding record, and accesses the page b11 of the index B.

In addition, by execution of the task 12C, the DBMS identifies the to-be-accessed lower page as b23 based on the search condition of the index B identified in t3 and the entries of the page b11, fetches the address of the page b23 by referring to the page b11, and accesses the page b23 based on the fetched address.

(t5)

By execution of the task 12A, the DBMS determines based on the search condition of the index B identified in t3 and the entries of the page b21 that the to-be-accessed lower page does not exist. Subsequently, in order to execute the task, the DBMS identifies the next to-be-accessed entry as A5 by referring to the context which is in correspondence with the data address set 13C existing in the DB buffer 436, checks the number of generatable tasks to be 0 by subtracting 1, fetches the address of the page A5 by referring to the data address set 13C, remove the corresponding task start information in which the number of generatable tasks becomes 0, and accesses the page A5 based on the fetched address. In addition, by execution of the task 12B, the DBMS identifies the to-be-accessed lower page as b22 based on the search condition of the index B identified in t4 and the entries of the page b11, fetches the address of the page b22 by referring to the page b11, and accesses the page b22 based on the fetched address.

In addition, by execution of the task 12C, the DBMS identifies the to-be-accessed record as B1 to B3 based on the search condition of the index B identified in t3 and the entries of the page b23 and generates the task start information. Namely, the DBMS generates a context and makes a correspondence between the page b23 where the addresses of the pages B1 to B3 identified to be accessed are stored as the data address set 13D and the generated context, sets the next to-be-accessed entry as B2 with respect to the context, and sets the number of generatable tasks to 2. Accordingly, the task start information is completed as a set of the data address set 13D and the context which is in correspondence with the data address set 13D. Subsequently, by execution of the task 12C, the DBMS accesses the page B1.

(t6)

By execution of the task 12A, the DBMS determines that the record A5 satisfies the condition designated by the query, identifies the search condition of the index B based on the corresponding record, and accesses the page b11 of the index B.

In addition, by execution of the task 12B, the DBMS determines based on the search condition of the index B identified in t4 and the entries of the page b22 that the to-be-accessed lower page does not exist. Subsequently, in order to execute the task, the DBMS identifies the next to-be-accessed entry as B2 by referring to the context which is in correspondence with the data address set 13D existing in the DB buffer 436, changes the next to-be-accessed entry into the next page B3, changes the number of generatable tasks into 1 by subtracting 1, fetches the address of the page B2 by referring to the data address set 13D, and accesses the page B2 based on the fetched address.

In addition, by execution of the task 12C, the DBMS determines that the record B1 satisfies the condition designated by the query, identifies the search condition of the index C based on the corresponding record, and accesses the page c11 of the index C.

(t7)

By execution of the task 12A, the DBMS identifies the to-be-accessed lower page as b24 based on the search condition of the index B identified in t6 and the entries of the page b11, fetches the address of the page b24 by referring to the page b11, and accesses the page b24 based on the fetched address.

By execution of the task 12B, the DBMS determines that the record B2 does not satisfy the condition designated by the query. Subsequently, in order to execute the task, the DBMS identifies the next to-be-accessed entry as B3 by referring to the context which is in correspondence with the data address set 13D existing in the DB buffer 436, checks the number of generatable tasks to be 0 by subtracting 1, fetches the address of the page B3 by referring to the data address set 13D, remove the corresponding task start information in which the number of generatable tasks becomes 0, and accesses the page B3 based on the fetched address. In addition, by execution of the task 12C, the DBMS identifies the to-be-accessed lower page as c21 based on the search condition of the index C identified in t6 and the entries of the page c11, fetches the address of the page c21 by referring to the page c11, and accesses the page c21 based on the fetched address.

In addition, herein, since the data address set 13D is consumed and the page storing the data address set of the task start information is removed in the DB buffer 436, the DMBS performs the process of reading the page storing the data address set 13A from the storage device group 443 into the DB buffer 436. In the case where a plurality of the pages storing the data address sets exist in the storage device group 443, the DBMS determines the data address set as a read object, for example, based on a result of comparison between a generation speed of the task start information and a consumption speed of the task start information and the number of generatable tasks retained in the context of the task start information.

More specifically, in the case where the generation speed of the task start information is smaller than the consumption speed of the task start information, the DBMS determines the pages storing the data address sets which are in correspondence with the context where the number of generatable tasks is equal to or larger than a predetermined threshold value as a read object and does not determine the pages storing the data address sets which are in correspondence with the context where the number of generatable tasks is smaller than the predetermined threshold value as a read object. In addition, the threshold value may be a designated fixed value, or the threshold value may be a variable value which is dynamically updated by the DBMS. As a variable value, for example, an average value of the number of generatable tasks of the entire contexts may be calculated, and the DBMS may update with the calculated value at arbitrary timing. In this manner, in the case where the total number of task start information tends to be decreased, the DBMS preferentially reads the pages storing the data address sets which are in correspondence with the context of which the number of generatable tasks is large. Accordingly, it is possible to expect a large number of the tasks to be efficiently executed.

In addition, in the case where the generation speed of the task start information is equal to or higher than the consumption speed of the task start information, the DBMS does not determine the pages storing the data address sets which are in correspondence with the context where the number of generatable tasks is equal to or larger than the predetermined threshold value as a read object and determines the pages storing the data address sets which are in correspondence with the context where the number of generatable tasks is smaller than the predetermined threshold value as a read object. In this manner, in the case where the total number of task start information tends to be increased, the DBMS preferentially reads the pages storing the data address sets which are in correspondence with the context of which the number of generatable tasks is small. Accordingly, it is possible to expect the task start information to be efficiently consumed.

In the example illustrated in FIG. 9, the DBMS reads the page stores the data address set 13A into the DB buffer 436.

(t8)

By execution of the task 12A, the DBMS determines based on the search condition of the index B identified in t6 and the entries of the page b24 that the to-be-accessed lower page does not exist. Subsequently, in order to execute the task, the DBMS identifies the next to-be-accessed entry as a24 by referring to the context which is in correspondence with the data address set 13A existing in the DB buffer 436, changes the next to-be-accessed entry into the next page a25, changes the number of generatable tasks into 1 by subtracting 1, fetches the address of the page a24 by referring to the data address set 13A, and accesses the page a24 based on the fetched address.

In addition, by execution of the task 12B, the DBMS determines that the record B3 does not satisfy the condition designated by the query. Subsequently, in order to execute the task, the DBMS identifies the next to-be-accessed entry as a25 by referring to the context which is in correspondence with the data address set 13A existing in the DB buffer 436, checks the number of generatable tasks to be 0 by subtracting 1, fetches the address of the page a25 by referring to the data address set 13A, erases the corresponding task start information, and accesses the page a25 based on the fetched address.

In addition, by execution of the task 12C, the DBMS identifies the to-be-accessed lower page as c31 based on the search condition of the index C identified in t6 and the entries of the page c21, fetches the address of the page c31 by referring to the page c21, and accesses the page c31 based on the fetched address.

(t9)

By execution of the task 12A, the DBMS identifies the to-be-accessed record as A6 based on the designated values of the query and the entries of the page a24, fetches the address of the record A6 by referring to the page a24, and accesses the page A6 based on the fetched address. In addition, by execution of the task 12B, the DBMS identifies the to-be-accessed record as A7 based on the designated values of the query and the entries of the page a25, fetches the address of the record A7 by referring to the page a25, and accesses the page A7 based on the fetched address.

In addition, by execution of the task 12C, the DBMS identifies the to-be-accessed record as C1 based on the search condition of the index C identified in t6 and the entries of the page c31, fetches the address of the record C1 by referring to the page c31, and accesses the page C1 based on the fetched address.

(t10)

By execution of the task 12A, the DBMS determines that the record A6 does not satisfy the condition designated by the query. Subsequently, in order to execute the task, the DBMS searches for the task start information where the number of generatable tasks is one or more. However, at this time, since there is no task start information where the number of generatable tasks is one or more, the DBMS ends the task 12A.

In addition, by execution of the task 12B, the DBMS determines that the record A7 does not satisfy the condition designated by the query. Subsequently, in order to execute the task, the DBMS searches for the task start information where the number of generatable tasks is one or more. However, at this time, since there is no task start information where the number of generatable tasks is one or more, the DBMS ends the task 12B.

In addition, by execution of the task 12C, the DBMS determines that the record C1 does not satisfy the condition designated by the query. Subsequently, in order to execute the task, the DBMS searches for the task start information where the number of generatable tasks is one or more. However, at this time, since there is no task start information where the number of generatable tasks is one or more, the DBMS ends the task 12C.

Through the processes described heretofore, by the time t9, all the access processes for the DB in the query execution plan are ended, and after that, the query process is ended.

As illustrated in FIG. 9, in comparison with the query process illustrated in FIG. 8, in the query process according to Embodiment 1, it is possible to reduce the number of times of accessing the storage device group 443, so that it is possible to execute the query process within a short time.

Hereinafter, Embodiment 1 will be described in detail.

Figure 10:
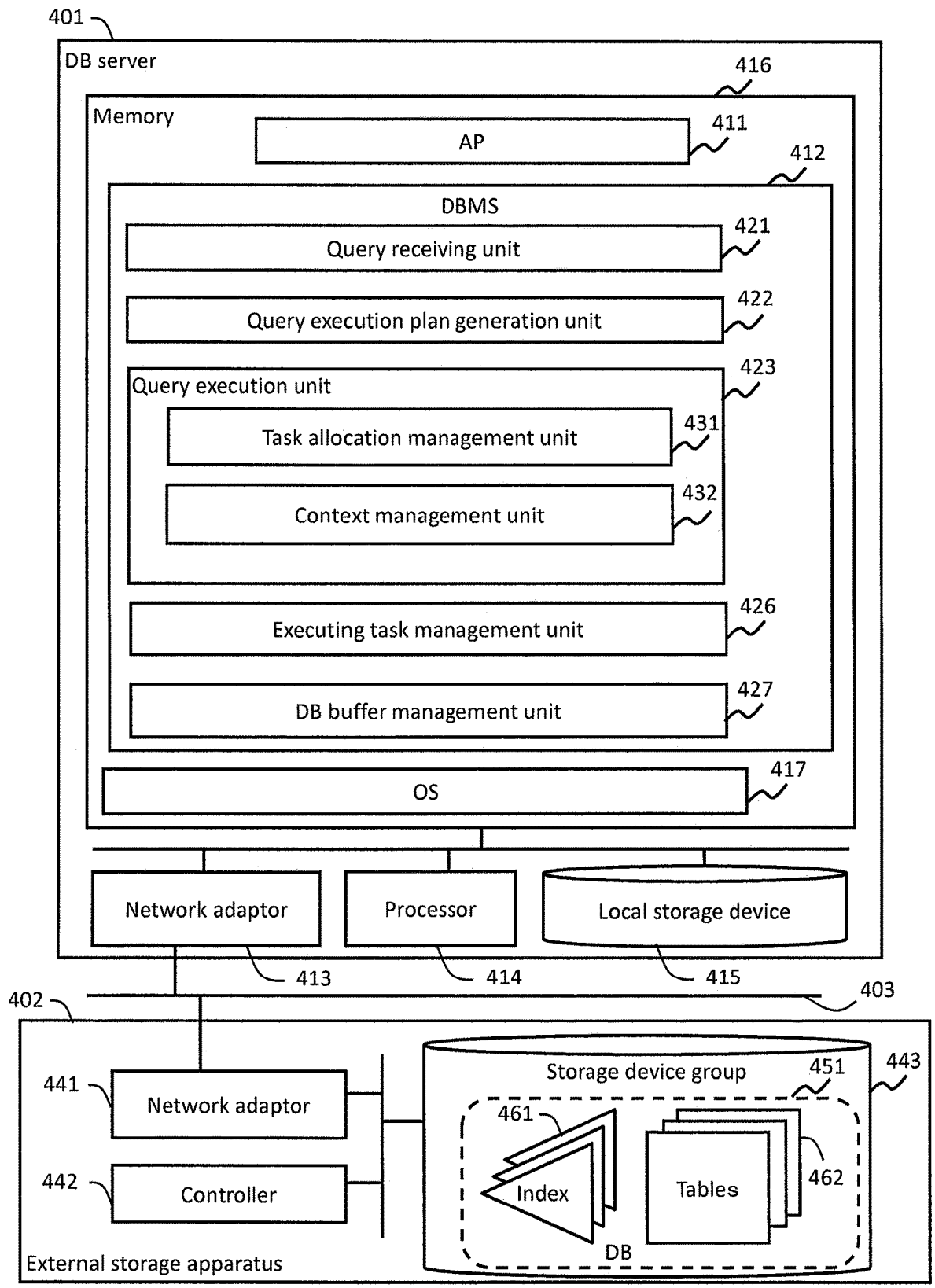
FIG. 10 illustrates a configuration of a computer system according to Embodiment 1.

FIG. 10 illustrates a configuration of the computer system according to Embodiment 1.

A DB server 401 is coupled to an external storage apparatus 402 via a communication network 403. As a protocol of communication via the communication network 403, for example, a fiber channel (FC), a small computer system interface (SCSI), or a transmission control protocol/Internet protocol (TCP/IP) may be employed.

The DB server 401 is a computer, for example, a personal computer, a workstation or a main frame, or virtual computer (virtual machine) configured with any one thereof. The DB server 401 is configured to include a network adaptor 413, a memory 416, a local storage device 415, and a processor (typically, a microprocessor) 414 connected thereto. The processor 414 executes a computer program, for example, an operating system (OS) 417, a DBMS 412, and an application program (AP) 411 for issuing a query to the DBMS 412. The memory 416 is an example of a main storage device (first storage device) and temporarily stores programs executed by the processor 414 and data used by the programs. The local storage device 415 stores programs and data used by the programs. The network adaptor 413 connects the communication network 403 and the DB server 401. The AP 411 may be operated by another computer (not shown) which is coupled to the communication network 403 rather than the DB server 401. In addition, the processor 414 may be an element included in a control device which is coupled to the network adaptor 413, the memory 416, or the like. Besides the processor 414, the control device may be configured to include a dedicated hardware circuit (for example, a circuit performing data encoding and/or decoding).

In addition, in terms of performance and redundancy, the DB server 401 may be configured to include a plurality of at least one element of the processor 414, the memory 416, the local storage device 415, and the network adaptor 413. In addition, the DB server 401 may be configured to include an input device (not shown) (for example, a keyboard and a pointing device) and a display device (not shown) (for example, a liquid crystal display). The input device and the display device may be integrally configured.

In the DB server 401, the DBMS 412 executes the query issued from the AP 411 and issues an I/O request with respect to the DB 451 stored in the external storage apparatus 402 according to the execution of the query to the OS 417. The OS 417 transmits the I/O request issued from the DBMS 412 to the external storage apparatus 402.

In the embodiment, the external storage apparatus 402 is a device configured with the storage device group 443 including a plurality of the storage devices such as disk array devices. However, alternatively, the external storage apparatus 402 may be a single storage device. The external storage apparatus 402 stores data and programs used by the DB server 401. The external storage apparatus 402 is an example of a secondary storage device (second storage device) for the DB server 401. The external storage apparatus 402 receives the I/O request from the DB server 401, executes the process according to the I/O request, and transmits a result of the process to the DB server 401.

The external storage apparatus 402 is configured to include a network adaptor 441, a storage device group 443, and a controller 442 connected thereto.

The network adaptor 441 connects the external storage apparatus 402 to the communication network 403.

The storage device group 443 is configured to include one or more storage devices. The storage device is a nonvolatile storage medium, for example, a magnetic disk, a flash memory, or other semiconductor memories. The storage device group 443 may be a group of storing data in a predetermined RAID (Redundant ARRAY of Independent Disks) level according to the RAID. A logical storage device (logical volume) based on a storage space of the storage device group 443 may be provided to the DB server 401. The storage device group 443 stores DB 451.

The controller 442 is configured to include, for example, a memory and a processor to input/output data with respect to the storage device group 443 storing the DB 451 according to the I/O request from the DB server 401. For example, the controller 442 stores the write-in-object data in the storage device group 443 according to the write-in request from the DB server 401 or reads the read-object data from the storage device group 443 according to the read request from the DB server 401 and transmits the data to the DB server 401.

In addition, in terms of performance and redundancy, the external storage apparatus 402 may be configured to include a plurality of elements such as the controller 442.

The DBMS 412 manages the DB 451 including business data. The DB 451 includes one or more tables 462 or indices 461. Each table is a set of one or more records, and each record is configured with one or more columns. Each index is a data structure which is produced by defining one or more columns in each table as objects and increases a speed of accessing the table according to a selection condition that the columns as the objects defined by the index are included. For example, the index is a data structure which retains information (record IDs) identifying records of the table including each of values of the columns defined as the objects for each value, and a B-tree structure or the like is used. Examples of configurations of the tables of the DB and relationships between the tables are illustrated in FIGS. 1 to 3 and FIG. 6.

The DBMS 412 is configured to include a query reception unit 421, a query execution plan generation unit 422, a query execution unit 423, an executing task management unit 426, and a DB buffer management unit 427.

The query reception unit 421 receives a query issued by the AP 411. The query is described in, for example, a structured query language (SQL).

With respect to the query received by the query reception unit 421, the query execution plan generation unit 422 generates the query execution plan including one or more DB operations necessary for executing the corresponding query. The query execution plan is, for example, information defining an execution sequence of the DB operations which are to be performed at the time of the execution of the query as a tree structure and is stored in the memory 416. An example of the query execution plan is illustrated in FIG. 5.

The query execution unit 423 dynamically generates the task which is information for executing the DB operation which is information included in the query execution plan according to the query execution plan generated by the query execution plan generation unit 422 and executes the task. Next, the query execution unit 423 returns a result of the execution to the query issuing source. For example, the query execution unit 423 performs (a) requesting the task for executing the DB operation to the executing task management unit 426 to generate the task, (b) executing the generated task to read the data necessary for the DB operation corresponding to the task (issuing the read request to the external storage apparatus 402 including the DB 451 through the OS 417), (c) in case of executing an (N+1)-th DB operation based on a result of the execution of the N-th DB operation corresponding to the task executed in the (b), requesting the task based on the result of the execution to the executing task management unit 426 to newly generate the task (N is an integer of 1 or more), and (d) repeating the (b) and the (c) with respect to the newly generated task. In the (b) and the (d), in the case where two or more executable tasks exist, the query execution unit 423 executes at least two tasks among the two or more tasks in parallel. In addition, the query execution unit 423 is configured to include a task allocation management unit 431 and a context management unit 432. The task allocation management unit 431 manages the execution start of the task. The context management unit 432 manages the context CTX of the task start information TS which is information representing a content of the performed execution of the task. An example of the task start information is illustrated in FIG. 7. In addition, the details of the query execution unit 423, the task allocation management unit 431, and the context management unit 432 will be described later.

Executing task management unit 426 manages the task for executing the query. For example, the executing task management unit 426 manages memory resources for generating the task. According to the request for generating the task from the query execution unit 423, the executing task management unit 426 secures the memory resources necessary for the task itself and generates the task. In addition, according to the request for ending the task from the query execution unit 423, the executing task management unit 426 releases the memory resources necessary for the task itself and ends the task. Herein, as the task, an arbitrary module may be employed. For example, the task may be a process or a thread managed by the OS 417, or the task may be a pseudo-process or a pseudo-thread implemented in DBMS 412.

The DB buffer management unit 427 manages one or more storage areas (DB buffer surfaces) 437 for temporarily storing the pages in the DB 451. The DB buffer surfaces 437 are implemented on the memory 416. In addition, details of the DE buffer management unit 427 will be described later.

Figure 11:
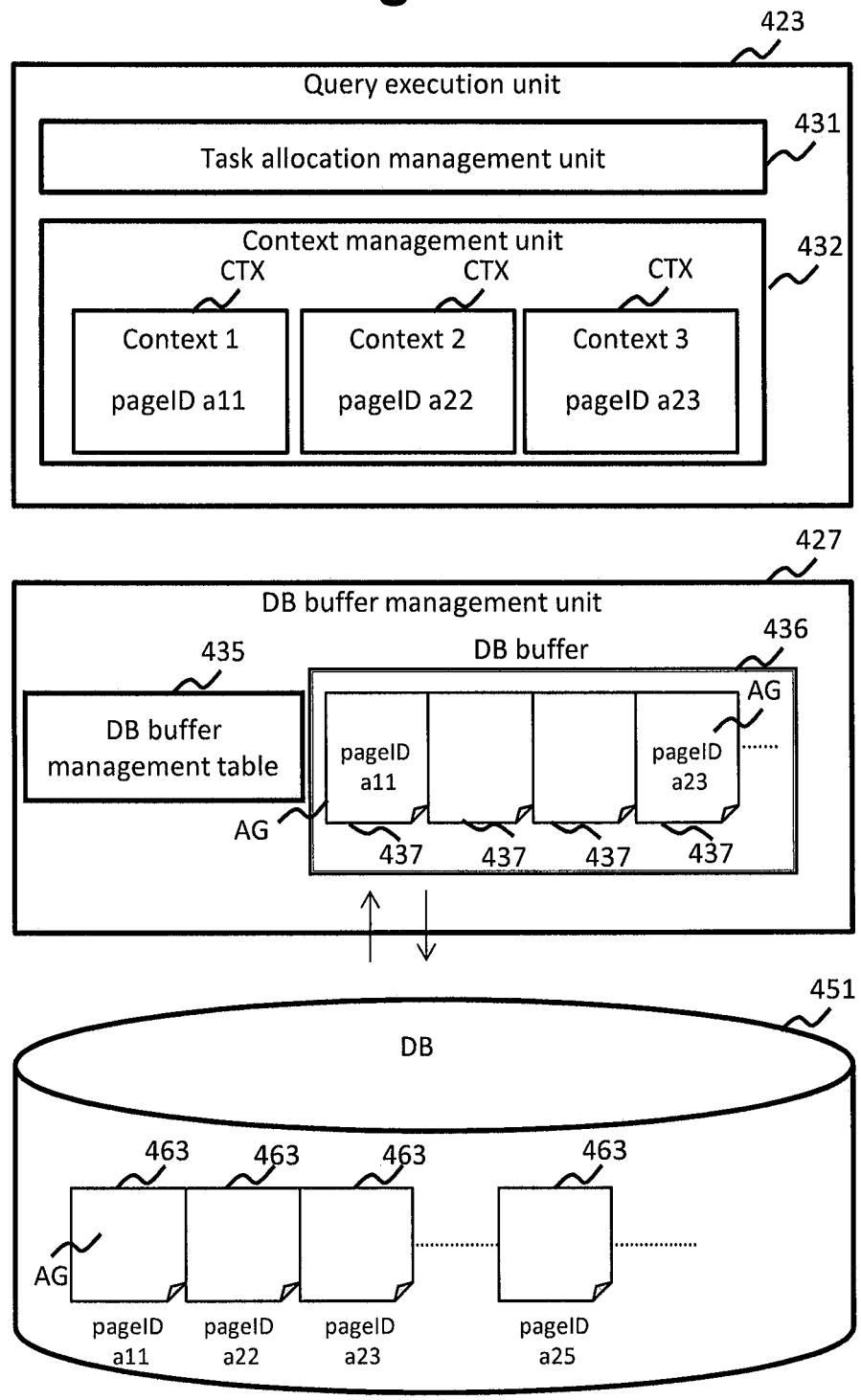
FIG. 11 is a detailed configuration diagram illustrating a portion of the computer system according to Embodiment 1.

FIG. 11 is a detailed configuration diagram illustrating a portion of the computer system according to Embodiment 1.

The query execution unit 423 is configured to include a task allocation management unit 431 and a context management unit 432. The query execution unit 423 dynamically generates the task start information TS which is information representing a content of the performed execution of the task according to the query execution plan generated by the query execution plan generation unit 422 and executes the DB operation in the query execution plan by executing the task based on the generated task start information. The context management unit 432 manages the context CTX of the one or more task start information TS. The context CTX stores information (for example, a page ID) identifying the page in the storage device group 443 of the external storage apparatus 402 storing the data address set AG, information representing entries which are to be accessed by the task of which execution is started next among the entries stored in the data address set AG, and the number (the number of generatable tasks) of remaining entries which are to be accessed by the further execution of the task. Every time when the task start information TS is generated, the context management unit 432 adds the context CTX of the corresponding task start information to management objects; and every time when the task start information TS is removed, the context management unit 432 removes the context CTX of the corresponding task start information from the management objects. The task allocation management unit 431 determines the task start information TS which is to be referred to when the query execution unit 423 starts the execution of the task, fetches the context CTX of the corresponding task start information from the context management unit, and identifies the access-object page by referring to the data address set AG which is in correspondence with the context. The query execution unit 423 starts the execution of the task and accesses the identified page. In addition, the task allocation management unit 431 removes the task start information TS where the number of generatable tasks of the context CTX becomes 0.

The DB buffer management unit 427 manages the DB buffer 436 including the one or more storage areas (DB buffer surfaces) 437 for temporarily storing the pages inside the DB 451. In addition, the number of DB buffer surfaces 437 in the DB buffer 436 is limited to a predetermined number. In addition, the DB buffer management unit 427 stores a DB buffer management table 435 for managing the pages stored in the DB buffer surfaces 437. The DB buffer management unit 427 reads a content of the page of the DB 451 into the DB buffer surfaces 437 or expels the page stored in the DB buffer surfaces 437 from the DB buffer surfaces 437. Herein, the expulsion of the data from the DB buffer surfaces 437 is referred to as release of the DB buffer surfaces 437. In addition, when the DB buffer management unit 427 releases the DB buffer surfaces 437, in the case where the released date are dirty data, that is, data which are not reflected in the DB 451, the DB buffer management unit 427 may move the page into the DE 451 to store the page; and in the case where the released data are not dirty data, the DB buffer management unit 427 may erase the data from the DB buffer surfaces 437.

The query reception unit 421, the query execution plan generation unit 422, the query execution unit 423, the executing task management unit 426, and the DB buffer management unit 427 described above are implemented by the processor 414 executing the DBMS 412. However, at least a portion of the processes performed by at least one processing unit among the above units may be performed by hardware. In addition, in the description of the embodiment, in the case where the processing unit is the subject, the process is actually performed by the processor 414 executing the processing unit. However, in the case where at least a portion of the processing unit is implemented with hardware, instead of or in addition to the processor 414, the hardware may be the subject. A computer program such as the DBMS 412 may be installed in the DB server 401 from a program source. The program source may be, for example, a storage medium which can be read by the DE server 401.

In addition, the configuration of the DBMS 412 illustrated in FIGS. 10 and 11 is exemplary one. For example, the processing unit may be divided into a plurality of processing units, or one processing unit where the processes of the processing units are integrated may be implemented.

FIG. 12 illustrates a configuration of the DB buffer management table 435 according to Embodiment 1.

The DB buffer management table 435 is configured to include a buffer ID 435*a* and a page ID 435*b* as information of each of the DB buffer surfaces 437. Various types of information are as follows.

(*) The buffer ID 435*a* represents an ID for identifying the DB buffer surface 437.

(*) The page ID 435*b* is information (herein, a page ID) identifying a storage location of the page stored in the corresponding DB buffer surface 437 in the external storage apparatus 402. In addition, in the case where no page is stored in the corresponding DB buffer surface 437, information representing empty is set as the page ID 435*b*.

Hereinafter, various processes performed in the embodiment will be described with reference to FIGS. 13 to 22.

Figure 13:
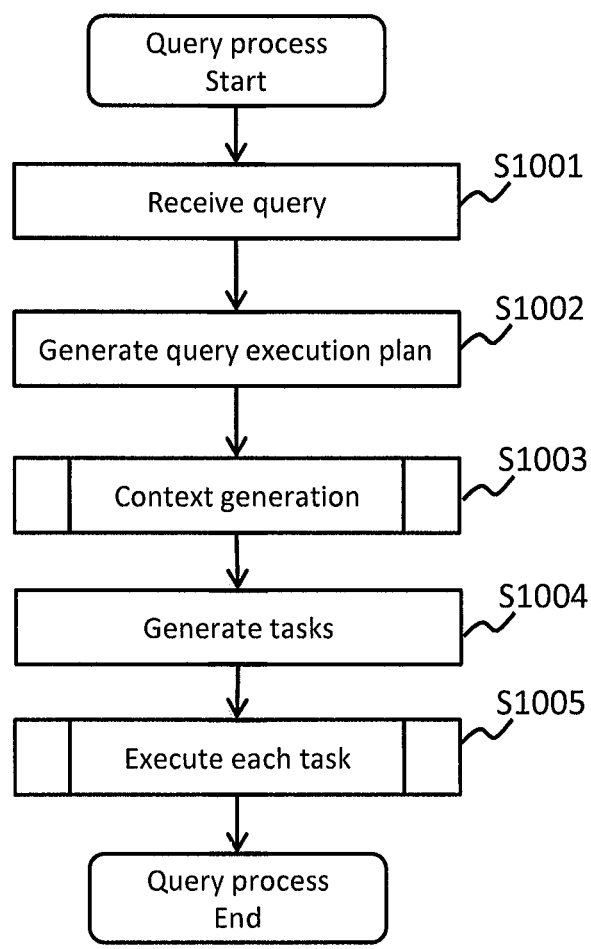
FIG. 13 illustrates a flow of a query process according to Embodiment 1.

FIG. 13 illustrates a flow of the entire query process of generating the task and executing the query in the execution of the query received by the DBMS 412. Although FIG. 13 illustrates a flow of the execution of one query, in the case where there are two or more queries which are to be simultaneously executed, the DBMS 412 may perform the process illustrated in FIG. 13 with respect to the two or more queries in parallel.

In S1001, the query reception unit 421 receives the query issued by the AP 411 and stores the query in, for example, the memory 416. The query is described in, for example, a structured query language (SQL).

In S1002, the query execution plan generation unit 422 generates a query execution plan corresponding to the query (for example, the query stored in the memory 416) received by the query reception unit 421 based on statistics information (hereinafter, referred to as "DB statistics information") of the data of the DB 451. At this time, costs for each of one or more candidates for the query execution plan may be calculated, and one candidate for the query execution plan among the candidates may be selected as the query execution plan. The DB statistics information may include, for example, information representing the number of records with respect to each table 462 and statistics information such as bar graph representing maximum and minimum values of data of each column or data distribution situation of each column. The DB statistics information is stored in the local storage device 415 or the memory 416. The DB statistics information may be generated by the DBMS 412 checking the DB 451, or the DB statistic information may be input from outside of the DBMS 412. In addition, the query execution plan may be generated based on the description of the query as well as the DB statistics information.

In S1003, the query execution unit 423 generates a context, the context management unit 432 manages the generated context. The context is a context representing a content of the execution of the forefront DB operation of the query execution plan generated in S1002.

In S1004, the query execution unit 423 generates one or more tasks.

In S1005, the query execution unit 423 executes the task generated in S1004.

Figure 14:
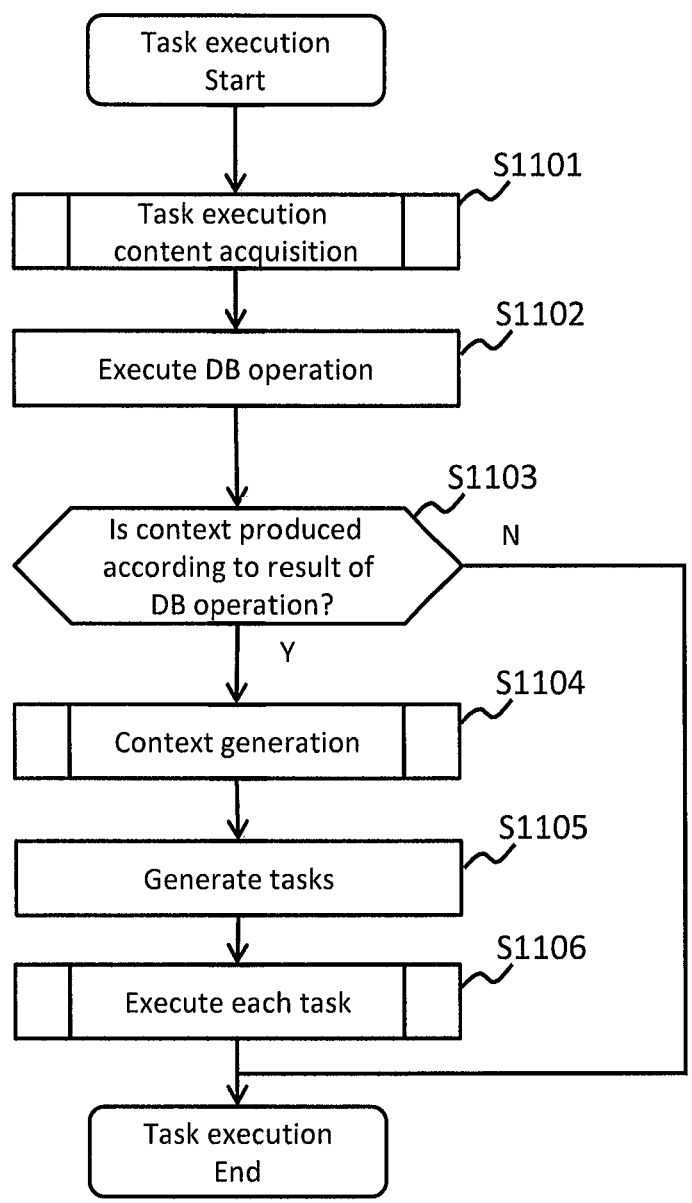
FIG. 14 illustrates a flow of a task execution process according to Embodiment 1.

FIG. 14 illustrates a flow of the task execution process by the DBMS according to Embodiment 1.

Figure 15:
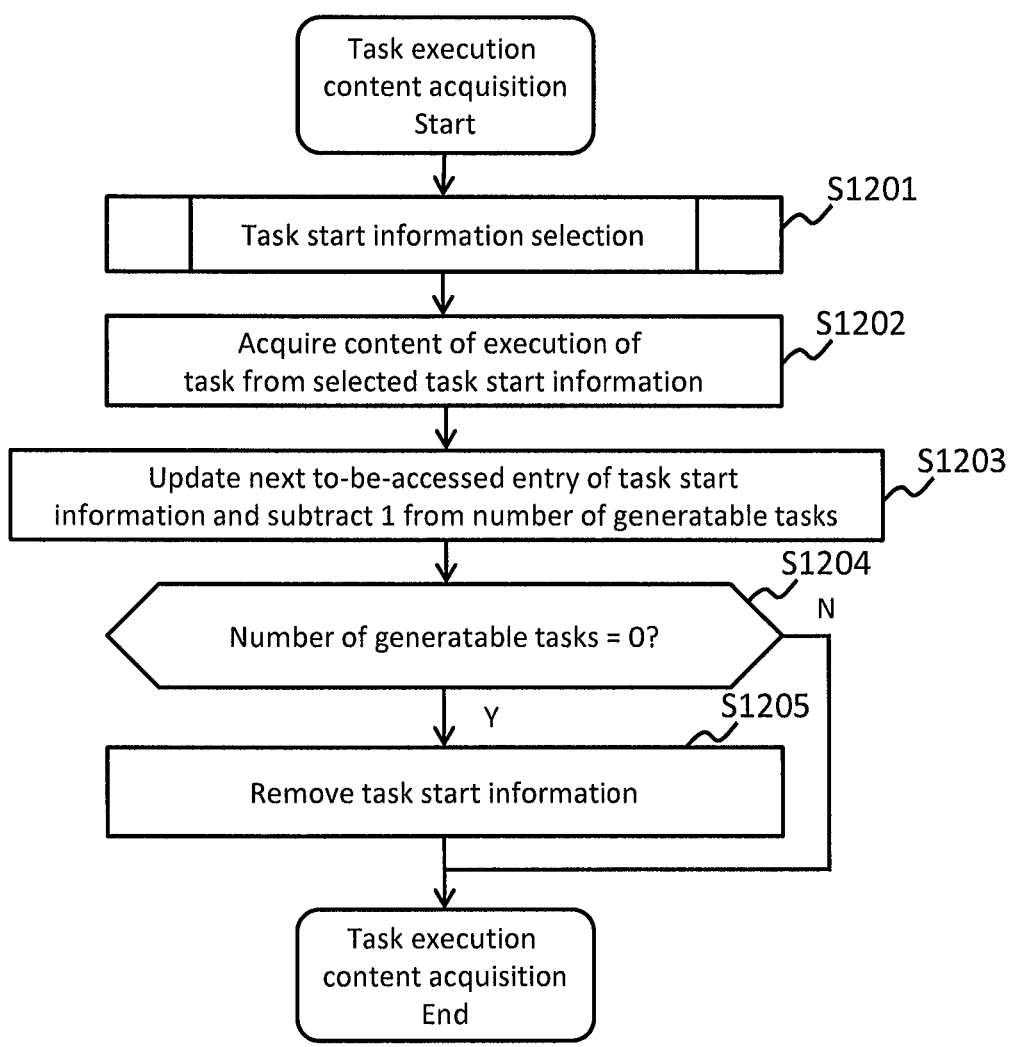
FIG. 15 illustrates a flow of a task execution content acquisition process according to Embodiment 1.

In S1101, the task allocation management unit 431 fetches a content of the execution of the task. Details of the task execution content acquisition process are illustrated in FIG. 15.

In S1102, the query execution unit 423 executes the DB operation by executing the task based on the content of the execution of the task fetched in S1101.

In S1103, the query execution unit 423 determines based on a result of the DB operation executed by the task in S1102 whether or not the context is generated. If the result of the determination is positive, S1104 is performed; and if the result of the determination is negative, the process is ended.

In S1104, the query execution unit 423 generates a context CTX, and the context management unit 432 manages the generated context. The context CTX includes information (for example, a page ID) identifying the page in the storage device group 443 of the external storage apparatus 402 storing the data address set AG, information representing entries which are to be accessed by the task of which execution is started next among the entries stored in the data address set AG, and the number (the number of generatable tasks) of remaining entries which are to be accessed by the further execution of the task.

In S1105, according to the request for generating the task from the query execution unit 423, the executing task management unit 426 generates the task.

In S1106, the query execution unit 423 executes the task generated in S1104.

FIG. 15 illustrates a flow of the task execution content acquisition process (S1101 in FIG. 14) according to Embodiment 1.

Figure 16:
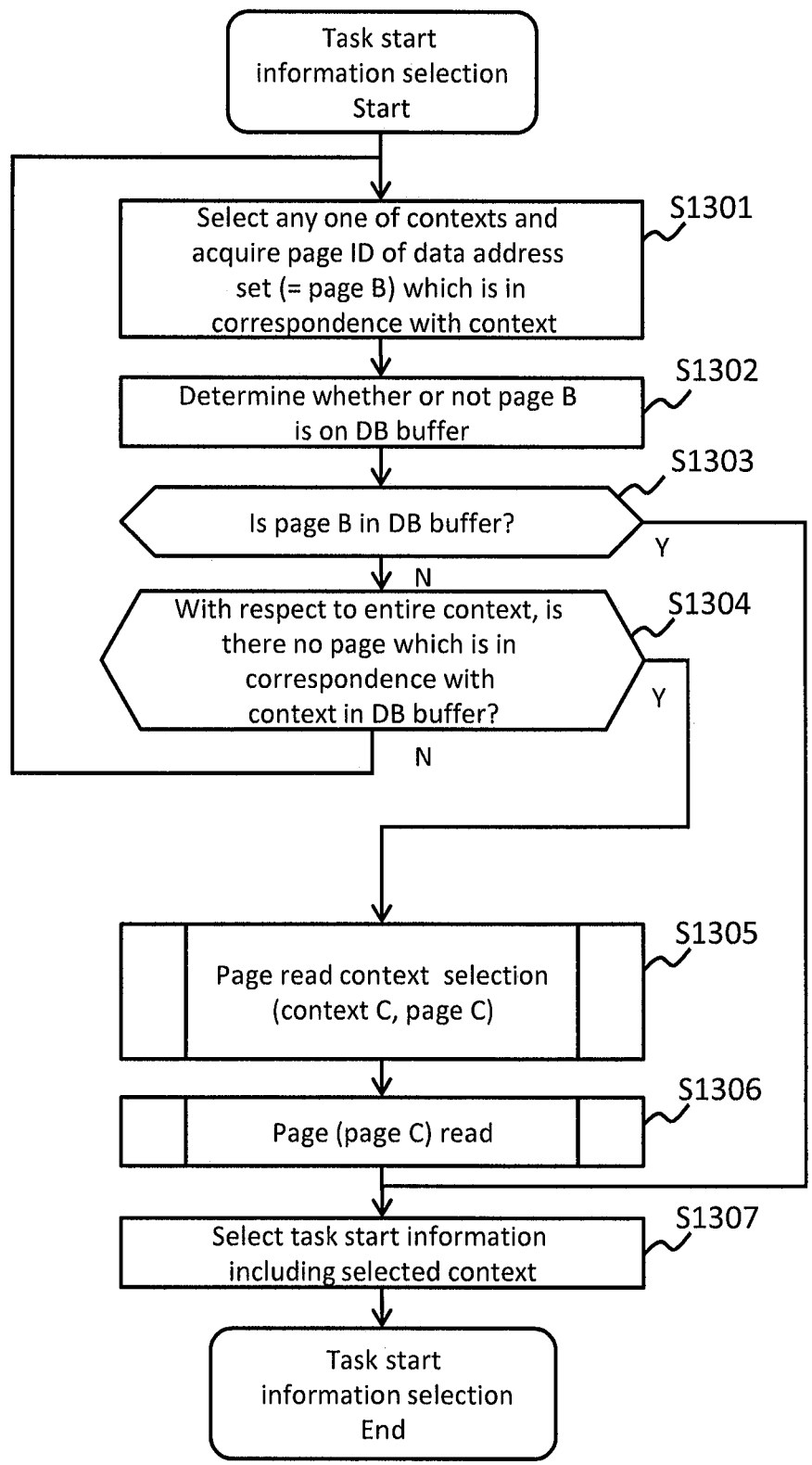
FIG. 16 illustrates a flow of a task start information selection process according to Embodiment 1.

In S1201, the task allocation management unit 431 performs the task start information selection process. The task start information TS is a set of the context CTX and the data address set AG which is in correspondence with the context CTX. Details of the task start information selection process are illustrated in FIG. 16.

In S1202, the task allocation management unit 431 fetches the content of the execution of the task from the task start information TS selected in S1201. The content of the execution of the task includes the address of the access-object page fetched from the context CTX and the data address set AG of the task start information TS.

In S1203, the task allocation management unit 431 updates the entry which is retained in the context CTX of the task start information TS selected in S1201 and is to be accessed by the task of which execution is started next to the next entry and subtracts 1 from the number of generatable tasks of the context CTX.

In S1204, the task allocation management unit 431 determines whether or not the number of generatable tasks of the context CTX of the task start information TS selected in S1201 is 0. If the result of the determination is positive, S1205 is performed; and if the result of the determination is negative, the process is ended.

In S1205, the task allocation management unit 431 removes the task start information TS selected in S1201, and the context management unit 432 removes the context CTX of the corresponding task start information TS from the management objects.

FIG. 16 illustrates a flow of the task start information selection process (S1201 in FIG. 15).

In S1301, the task allocation management unit 431 selects one of the contexts which are managed by the context management unit 432 and fetches a page ID of a page (herein, in the description of the process, the page is referred to as a page B) storing the data address set which is in correspondence with the context.

In S1302, the task allocation management unit 431 determines whether or not the fetched page B is on the DB buffer 436. More specifically, the task allocation management unit 431 transmits an inquiry request including the page ID to the DB buffer management unit 427 so as to inquire whether or not the page of the corresponding page ID is stored in DB buffer 436 and determines based on a result of the inquiry whether or not the fetched page B is on the DB buffer 436. The DB buffer management unit 427 receives the inquiry and determines by referring to the DB buffer management table 435 whether or not there is the page of the corresponding page ID and notifies a result thereof to the task allocation management unit 431.

In S1303, as a result of the determination in step S1302, in the case where the page B exists in the DB buffer 436 (Y in S1303), the task allocation management unit 431 performs the step S1307; and in the case where the page B does not exist in the DB buffer 436 (N in S1303), the task allocation management unit 431 performs the step S1304.

In S1304, in the case where the task allocation management unit 431 does not determine that the page storing the data address set which is in correspondence with the corresponding context in the entire contexts of the context management unit 432 does not exist in the DB buffer 436 (N in S1304), the task allocation management unit 431 proceeds to S1301, and the task allocation management unit 431 selects the next context and performs the following processes. On the other hand, in the case where the task allocation management unit 431 determines that the page storing the data address set which is in correspondence with the corresponding context in the entire contexts of the context management unit 432 does not exist in the DB buffer 436 (Y in S1304), the task allocation management unit 431 performs the process (S1305) of selecting a page read context.

Figure 17:
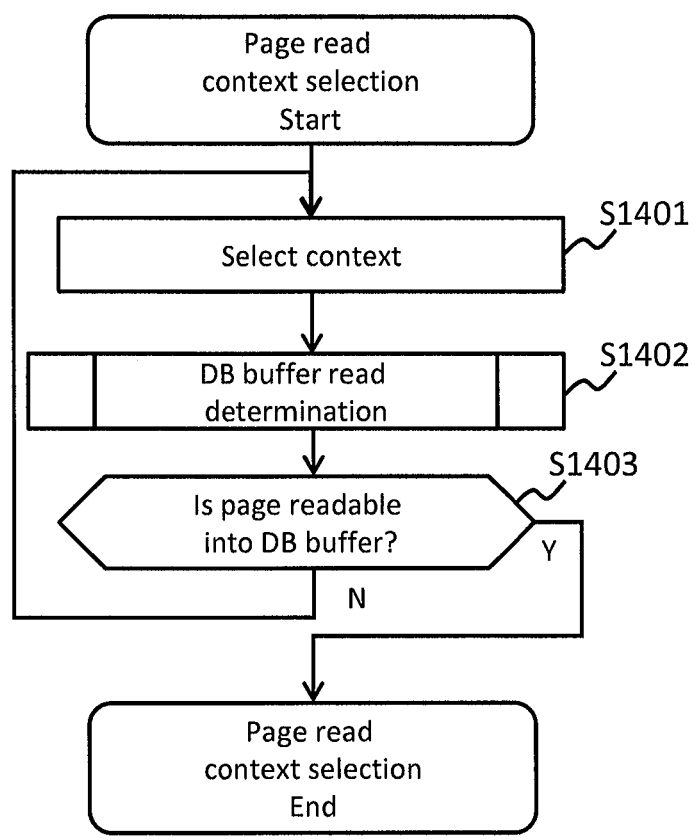
FIG. 17 illustrates a flow of a page read context selection process according to Embodiment 1.

In S1305, the task allocation management unit 431 executes a page read context selection process for selecting the context where the page storing the corresponding data address set is read from the external storage apparatus 402 into the DB buffer 436. Details of the page read context selection process are illustrated in FIG. 17. Referring to FIG. 17, the context where the page is read from the external storage apparatus 402 into the DB buffer 436 is selected by the page read context selection process. Herein, the selected page is denoted by the page C, and the selected context is denoted by the context C.

Figure 19:
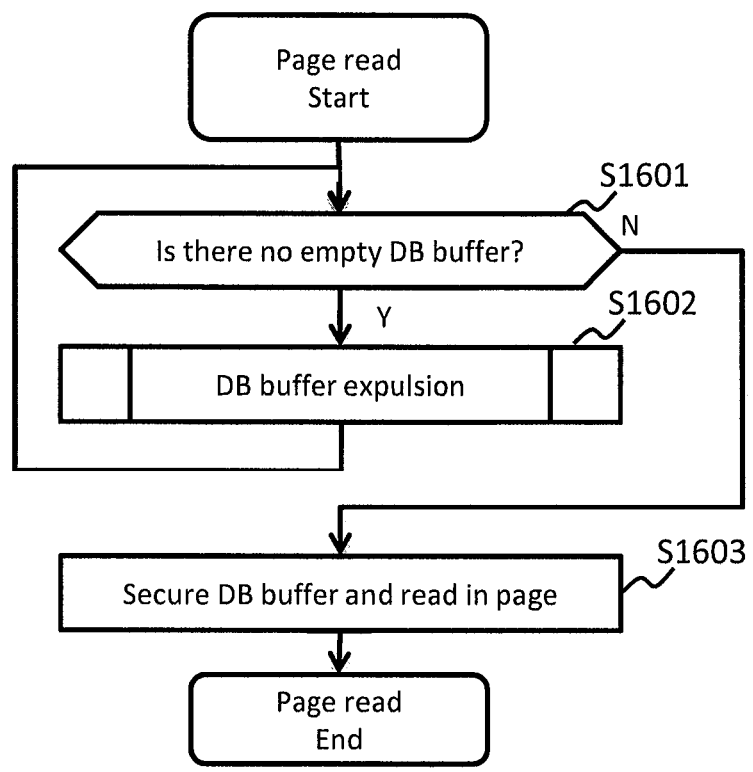
FIG. 19 illustrates a flow of a page read process according to Embodiment 1.

In S1306, the task allocation management unit 431 transmits a page read request for reading the page C into the DE buffer 436 to the DB buffer management unit 427. The DE buffer management unit 427 receives the page read request to read the page C from the external storage apparatus 402 into the DB buffer 436 and notifies to the task allocation management unit 431 that the page read process is ended. Details of the page read process are illustrated in FIG. 19. Referring to FIG. 19, by the page read process, the page C is read into the DB buffer 436.

In S1307, the task allocation management unit 431 selects the task start information including the selected context and ends the process.

FIG. 17 illustrates a flow of the page read context selection process (S1305 in FIG. 16).

In S1401, the task allocation management unit 431 selects one context as a process object from the contexts which the context management unit 432 manages.

Figure 18:
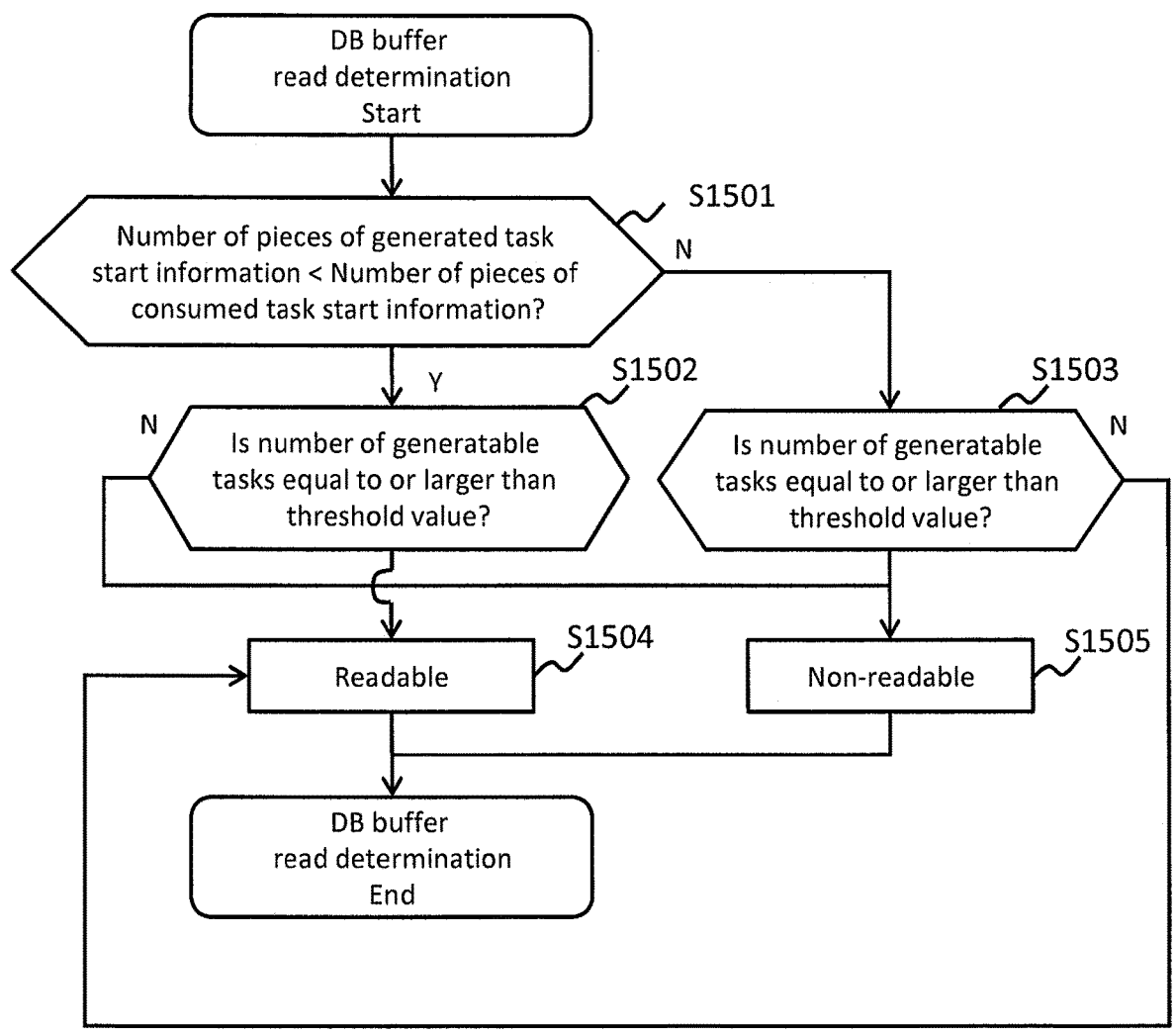
FIG. 18 illustrates a flow of a DB buffer read determination process according to Embodiment 1.

In S1402, the task allocation management unit 431 performs a DB buffer read determination process for determining whether or not a page storing the data address set which is in correspondence with the selected context is readable into the DB buffer 436. The details of the DB buffer read determination process are illustrated in FIG. 18. Referring to FIG. 18, by the DE buffer read determination process, it is possible to obtain a result of the determination as to whether or not the page which is in correspondence with the selected context is readable into the DE buffer 436.

In S1403, the task allocation management unit 431 determines whether or not the page which is in correspondence with the selected context is readable into the DB buffer 436, and in the case where the corresponding page is non-readable into the DB buffer 436 (N in S1403), the task allocation management unit 431 performs S1401 to select the next context and performs the following processes; and in the case where the corresponding page is readable into the DB buffer 436 (Y in S1403), the task allocation management unit 431 ends the process.

FIG. 18 illustrates a flow of the DB buffer read determination process (S1402 in FIG. 17).

In S1501, the task allocation management unit 431 determines whether or not the number of generated task start information per unit time is smaller than the number of consumed task start information per unit time, in the case where the number of generated task start information per unit time is smaller than the number of consumed task start information per unit time, that is, in the case where the total number of task start information tends to be decreased (Y in S1501), since the page storing the data address set which is in correspondence with the context of which the number of generatable tasks is large is preferentially read into the DB buffer 436, the task allocation management unit 431 proceeds to S1502; and in the case where the number of generated task start information per unit time is not smaller than the number of consumed task start information per unit time, that is, in the case where the total number of task start information tends to be increased (N in S1501), the task allocation management unit 431 proceeds to S1503.

In S1502, the task allocation management unit 431 determines whether or not the number of generatable tasks of the context selected in S1401 is equal to or larger than a predetermined threshold value. As a result thereof, in the case where the number of generatable tasks is equal to or larger than the threshold value (Y in S1502), the task allocation management unit 431 proceeds to S1504; and in the case where the number of generatable tasks is not equal to or larger than the threshold value (N in S1502), the task allocation management unit 431 proceeds to S1505.

In S1503, the task allocation management unit 431 determines whether or not the number of generatable tasks of the context selected in S1401 is equal to or larger than a predetermined threshold value. As a result thereof, in the case where the number of generatable tasks is equal to or larger than the threshold value (Y in S1503), the task allocation management unit 431 proceeds to S1505; and in the case where the number of generatable tasks is not equal to or larger than the threshold value (N in S1503) the task allocation management unit 431 proceeds to S1504.

In S1504, the task allocation management unit 431 determines that the page which is in correspondence with the selected context is readable, and the task allocation management unit 431 ends the DB buffer read determination process.

In S1505, the task allocation management unit 431 determines that the page which is in correspondence with the selected context is non-readable, and the task allocation management unit 431 ends the DB buffer read determination process.

According to the DB buffer read determination process, in the case where the total number of task start information tends to be decreased, the page which is in correspondence with the context of which the number of generatable tasks is large is preferentially read into the DB buffer 436, so that it is possible to efficiently execute a large number of the tasks. In the case where the total number of task start information tends to be increased, the page which is in correspondence with the context of which the number of generatable tasks is small is preferentially read into the DB buffer, so that it is possible to efficiently consume the task start information.

FIG. 19 illustrates a flow of the page read process (S1306 in FIG. 16).

In S1601, the DB buffer management unit 427 determines whether or not there is no empty DB buffer surface. In the case where there is no empty DB buffer surface (Y in S1601), the DB buffer management unit 427 proceeds to S1602; and in the case where there is an empty DB buffer surface (N in S1601), the DB buffer management unit 427 proceeds to S1603.

Figure 20:
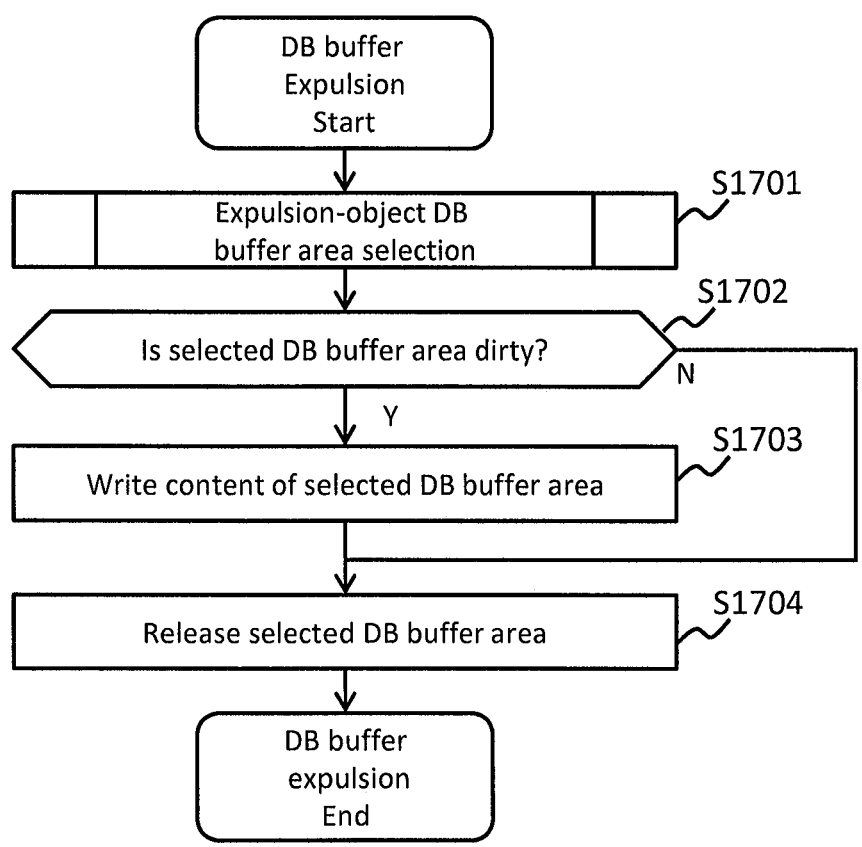
FIG. 20 illustrates a flow of a DB buffer expulsion process according to Embodiment 1.

In S1602, the DB buffer management unit 427 executes a DB buffer expulsion process of expelling data from the DB buffer 436. Details of the DB buffer expulsion process are illustrated in FIG. 20. Referring to FIG. 20, it is possible to generate an empty DB buffer surface by the DB buffer expulsion process. After the DB buffer expulsion process is ended, the DB buffer management unit 427 performs S1601.

In S1603, the DB buffer management unit 427 secures the empty DB buffer surface for storing the data of the page and reads the data of the page into the corresponding DB buffer surface.

FIG. 20 illustrates a flow of the DB buffer expulsion process (S1602 in FIG. 19).

Figure 21:
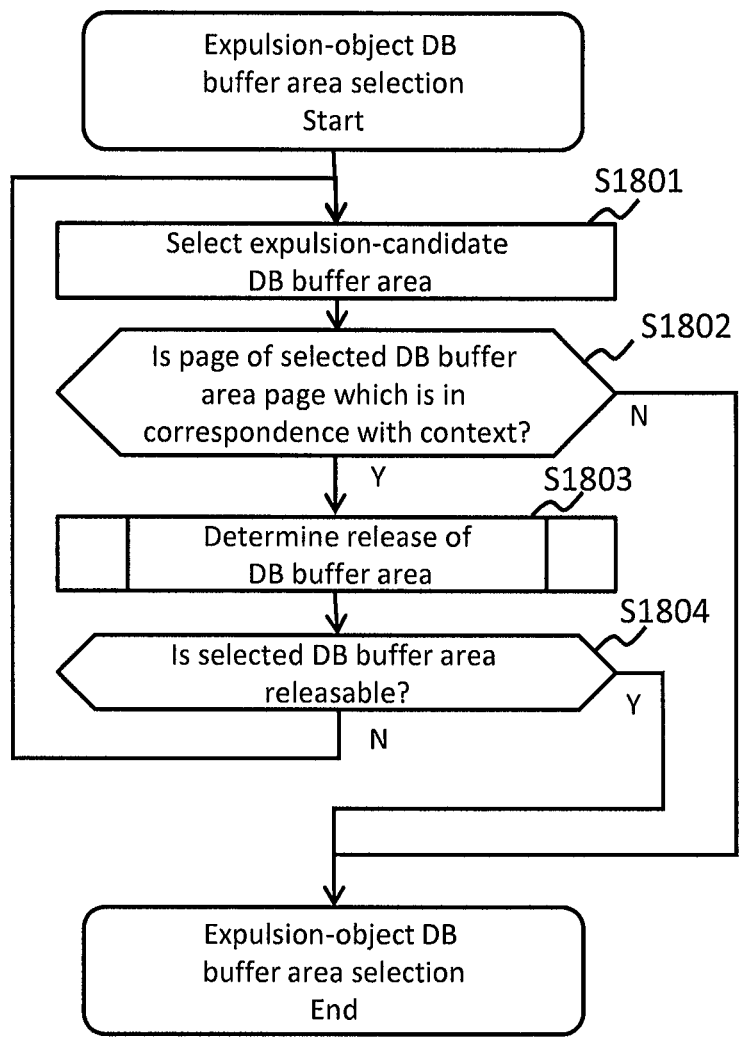
FIG. 21 illustrates a flow of an expulsion-object DB buffer surface selection process according to Embodiment 1.

In S1701, the DB buffer management unit 427 selects the DB buffer surface as a data expulsion object and executes an expulsion-object DB buffer surface selection process. Details of the expulsion-object DB buffer surface selection process are illustrated in FIG. 21. Referring to FIG. 21, by the expulsion-object DB buffer surface selection process, it is possible to select the DB buffer surface as a data expulsion object.

In S1702, the DB buffer management unit 427 determines whether or not the data of the selected DB buffer surface are dirty data. In the case where the data of the selected DB buffer surface are dirty data (Y in S1702), the DB buffer management unit 427 proceeds to S1703; and in the case where the data of the selected DB buffer surface are not dirty data (N in S1702), the DB buffer management unit 427 proceeds to S1704.

In S1703, the DB buffer management unit 427 writes out the content of the selected DB buffer surface to the storage device group 443 of the external storage apparatus 402.

In S1704, the DB buffer management unit 427 opens the selected DB buffer surface. Accordingly, the DB buffer surface becomes available.

In addition, the DB buffer expulsion process may be executed, for example, in the case where the number of empty DB buffer surfaces in the DB buffer 436 is equal to or smaller than a predetermined number.

FIG. 21 illustrates a flow of the expulsion-object DE buffer surface selection process (S1701 in FIG. 20).

In S1801, the DB buffer management unit 427 select one DB buffer surface as an expulsion candidate.

In S1802, the DB buffer management unit 427 determines whether or not the page stored in the selected DB buffer surface is the page which is in correspondence with the context. In the case where the corresponding page is the page which is in correspondence with the context (Y in S1802), the DB buffer management unit 427 proceeds to S1803; and in the case where the corresponding page is not the page which is in correspondence with the context (N in S1802), the DB buffer management unit 427 ends the process. Herein, the determination as to whether or not the page stored in the selected DB buffer surface is the page which is in correspondence with the context is performed, specifically, by the DB buffer management unit 427 transmitting an inquiry request including a page ID to the context management unit 432 to inquire whether or not the context which is in correspondence with the page of the corresponding page ID is managed by the context management unit 432 and performing the determination based on a result of the inquiry. The context management unit 432 receives the inquiry and determines whether or not the context which is in correspondence with the corresponding page ID is included in the managing contexts, and the context management unit 432 notifies a result thereof to the DB buffer management unit 427.

Figure 22:
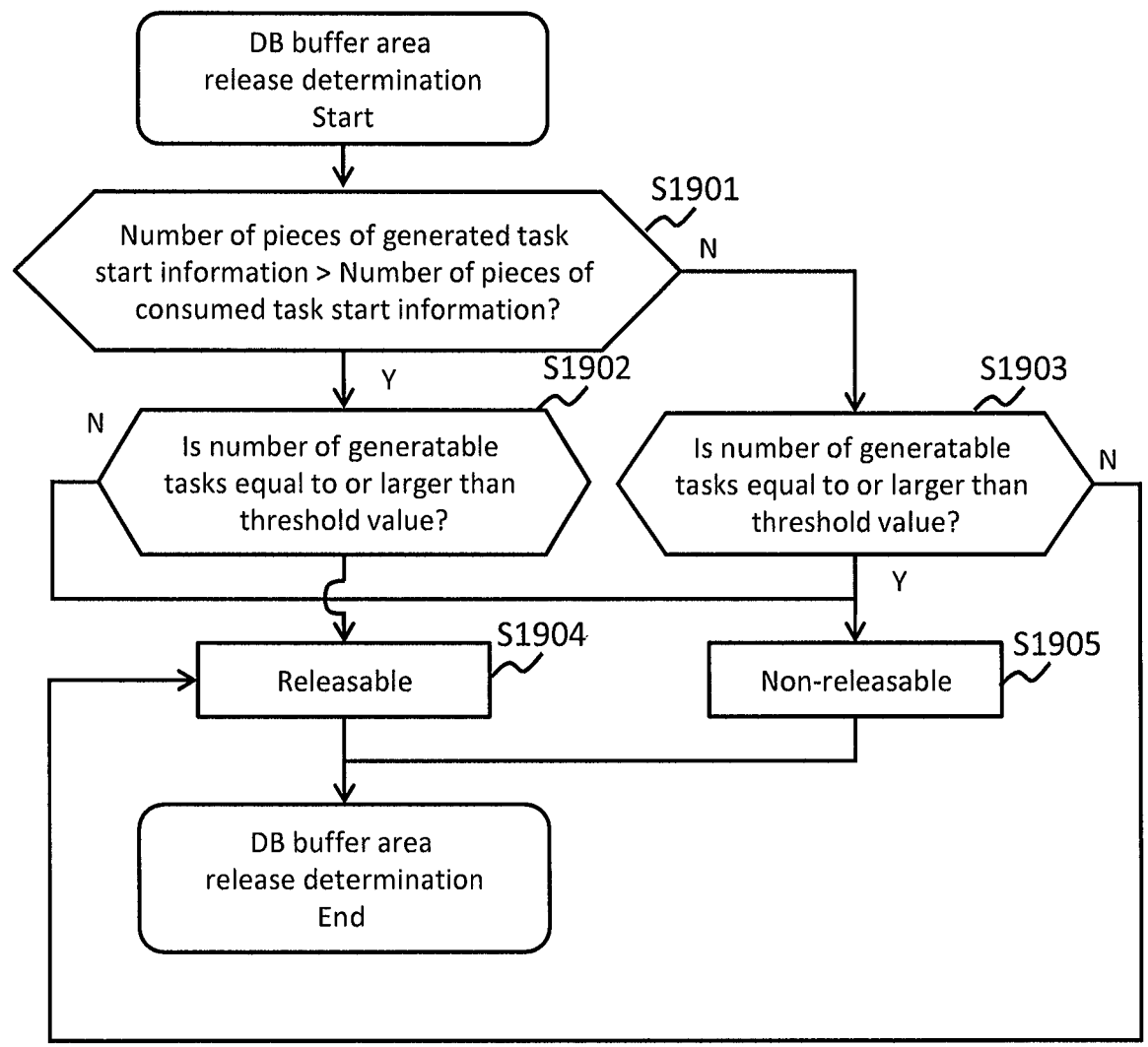
FIG. 22 illustrates a flow of a DB buffer surface release determination process according to Embodiment 1.

In S1803, the DB buffer management unit 427 executes a DB buffer surface release determination process for determining whether or not the selected DB buffer surface is releasable by the task allocation management unit 431. Details of the DB buffer surface release determination process are illustrated in FIG. 22. Referring to FIG. 22, it is possible to obtain a result of the determination as to whether or not the selected DB buffer is releasable by DB buffer surface release determination process.

In S1804, the DB buffer management unit 427 determines whether or not the selected DB buffer surface is releasable. In the case where it is not determined that the selected DB buffer is releasable (N in S1804), the DB buffer management unit 427 executes S1801 to select the next DB buffer surface and performs the following processes; and in the case where it is determined that the selected DB buffer surface is releasable (Y in S1804), the DB buffer management unit 427 ends the process.

FIG. 22 illustrates a flow of the DB buffer surface release determination process (S1803 in FIG. 21).

In S1901, the task allocation management unit 431 determines whether or not the number of generated task start information per unit time is larger than the number of consumed task start information per unit time. In the case where the number of generated task start information per unit time is larger than the number of consumed task start information per unit time, that is, in the case where the total number of task start information tends to be increased (Y in S1901), since the pages storing the data address sets which are in correspondence with the context of which the number of generatable tasks is large are preferentially expelled from the DB buffer 436, the task allocation management unit 431 proceeds to S1902. In the case where the number of generated task start information per unit time is not larger than the number of consumed task start information per unit time, that is, in the case where the total number of task start information tends to be decreased (N in S1901), the task allocation management unit 431 proceeds to S1903.

In S1902, the task allocation management unit 431 determines whether or not the number of generatable tasks of the context which is in correspondence with the page stored in the DB buffer surface selected in S1801 of FIG. 21 is equal to or larger than a predetermined threshold value. As a result thereof, in the case where the number of generatable tasks is equal to or larger than the threshold value (Y in S1902), the task allocation management unit 431 proceeds to S1904; and in the case where the number of generatable tasks is not equal to or larger than the threshold value (N in S1902), the task allocation management unit 431 proceeds to S1905.

In S1903, the task allocation management unit 431 determines whether or not the number of generatable tasks of the context which is in correspondence with the page stored in the DB buffer selected in S1801 of FIG. 21 is equal to or larger than a predetermined threshold value. As a result thereof, in the case where the number of generatable tasks is equal to or larger than the threshold value (Y in S1903), the task allocation management unit 431 proceeds to S1905; and in the case where the number of generatable tasks is not equal to or larger than the threshold value (N in S1903), the task allocation management unit 431 proceeds to S1904.

In S1904, the task allocation management unit 431 determines that the selected DB buffer is releasable, and the task allocation management unit 431 ends the DB buffer surface release determination process.

In S1905, the task allocation management unit 431 determines that the selected DB buffer is non-releasable and ends the DB buffer surface release determination process.

According to the DB buffer surface release determination process, in the case where the total number of task start information tends to be increased, the task allocation management unit 431 preferentially releases the DB buffer surface storing the page which is in correspondence with the context of which the number of generatable tasks is large and allows the page which is in correspondence with the context of which the number of generatable tasks is small to remain in the DB buffer, so that it is possible to efficiently consume the task start information. In addition, in the case where the total number of task start information tends to be decreased, the task allocation management unit 431 preferentially releases the DB buffer surface storing the page which is in correspondence with the context of which the number of generatable tasks is small and allows the page which is in correspondence with the context of which the number of generatable tasks is large to remain in the DB buffer, so that it is possible to efficiently start the execution of a large number of the tasks without performing access to the storage device group 443.

Embodiment 2

Hereinafter, Embodiment 2 will be described. Different points with respect to Embodiment 1 will be mainly described, and common points with respect to Embodiment 1 will be omitted or described in brief.

Figure 23:
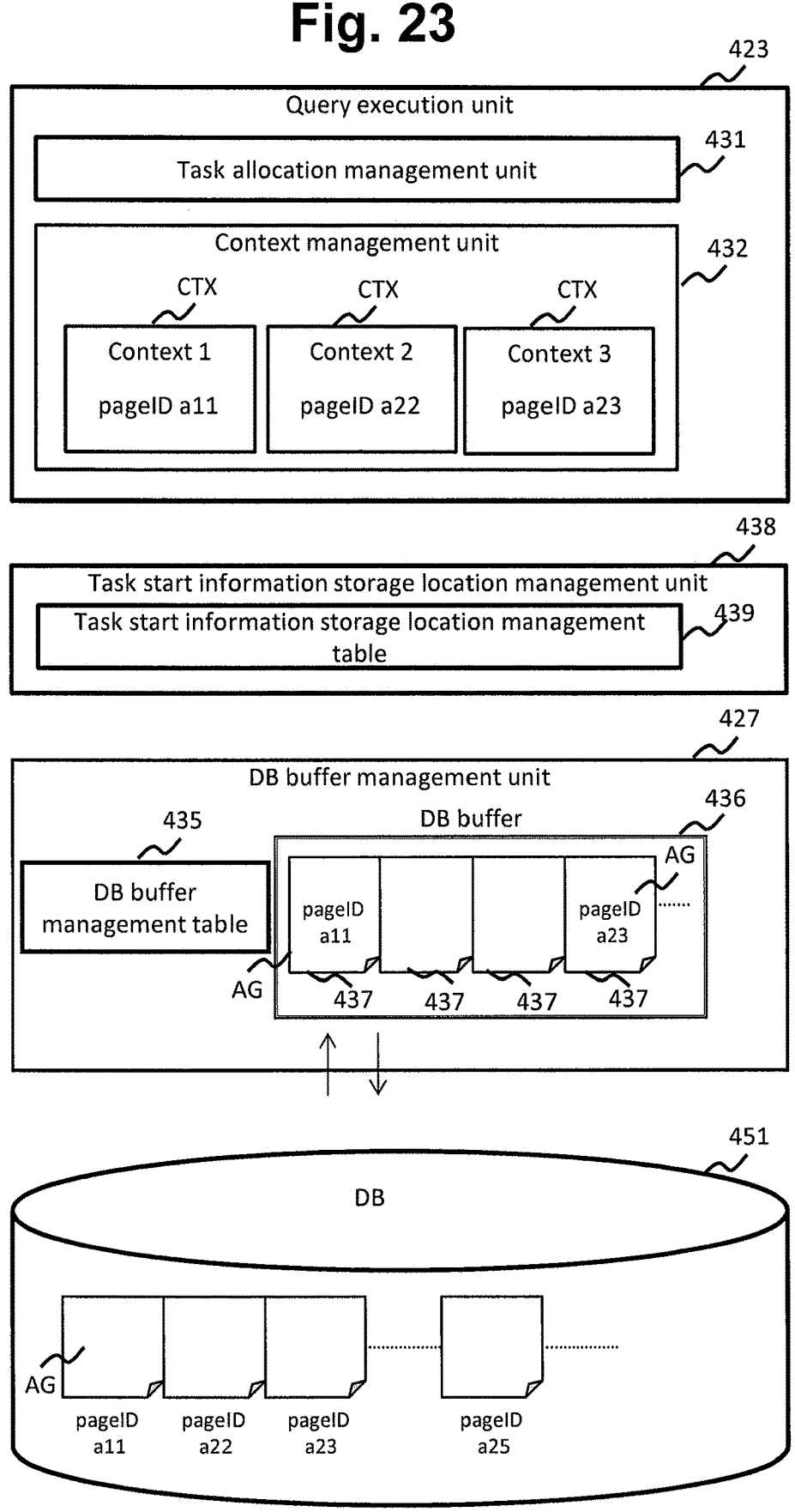
FIG. 23 is a detailed configuration diagram illustrating a portion of a computer system according to Embodiment 2.

FIG. 23 illustrates a detailed configuration diagram illustrating a portion of a computer system according to Embodiment 2.

In Embodiment 2, a portion of the processes of the task allocation management unit 431 according to Embodiment 1 and a portion of the processes of the DB buffer management unit 427 according to Embodiment 1 are performed by a task start information storage location management unit 438 which is newly installed. Therefore, the processes of the task allocation management unit 431 and the processes of the DB buffer management unit 427 are changed.

The task start information storage location management unit 438 manages a task start information storage location management table 439 and replies to inquiries from the task allocation management unit 431 and the DB buffer management unit 427. The task start information storage location management unit 438 performs registration, removal, updating, and the like of entries of the task start information location management table 439 based on the notification from the task allocation management unit 431 or the DB buffer management unit 427. In the case where there is an inquiry from the task allocation management unit 431 as to whether or not the pages storing the data address sets are in the DB buffer, the task start information storage location management unit 438 determines by referring to the task start information storage location management table 439 whether or not the storage location of the corresponding data address set is a main storage (that is, a DB buffer) and notifies a result of the determination to the task allocation management unit 431. In addition, in the case where there is an inquiry from the DB buffer management unit 427 as to whether or not the DB buffer may be released, the task start information storage location management unit 438 determines by referring to the task start information storage location management table 439 whether or not the data of the corresponding DB buffer may be released from the main storage and notifies a result of the determination to the DB buffer management unit 427.

FIG. 24 illustrates a configuration of the task start information storage location management table according to Embodiment 2.

The task start information storage location management table 439 is configured to include a task start information ID 439a, a data address set storage location 439b, and a main storage expulsion capability 439c as information of each task start information. Various types of information are as follows.

(*) The task start information ID 439a represents an ID (task start information ID) for identifying the task start information.

(*) The data address set storage location 439b is information of a storage location where the data address set of the corresponding task start information is stored. For example, in the case where the data address set is stored in the DB buffer surface 437, the data address set storage location 439b becomes a "main storage"; and in the case where the data address set is stored in the storage device group 443 of the external storage apparatus 402 rather than the DB buffer, the data address set storage location 439b becomes a "secondary storage".

(*) The main storage expulsion capability 439c represents whether or not the corresponding data address set is releasable from the main storage device, that is, the DB buffer surfaces 437.

In the case where the task allocation management unit 431 generates the task start information, in the case where the task allocation management unit 431 removes the task start information, and in the case where the task allocation management unit 431 changes the releasability of the page storing the data address set of the task start information from the DB buffer, the task allocation management unit 431 notifies the content thereof to the task start information storage location management unit 438. In the embodiment, for example, the task allocation management unit 431 executes the DB buffer release determination process illustrated in FIG. 22 with respect to each task start information as the object at a predetermined timing and notifies a result of the determination representing the releasability of the DB buffer surface storing the page storing the data address set of each task start information to the task start information storage location management unit 438.

The task allocation management unit 431 inquires the task start information storage location management unit 438 whether or not the page storing the data address set which is in correspondence with the context is in the DB buffer 436.

In the case where the DB buffer management unit 427 secures the DB buffer surface storing the page storing the data address set of the task start information and in the case where the DB buffer management unit 427 releases the DB buffer surface, the DB buffer management unit 427 notifies the content thereof to the task start information storage location management unit 438.

The DB buffer management unit 427 inquires of the task start information storage location management unit 438 as to whether or not the DB buffer surface may be opened.

According to Embodiment 2, it is possible to obtain the same effects as Embodiment 1.

Embodiment 3

Hereinafter, Embodiment 3 will be described. Different points with respect to the first and Embodiment 2s will be mainly described, and common points with respect to the first and Embodiment 2s will be omitted or described in brief.

Figure 25:
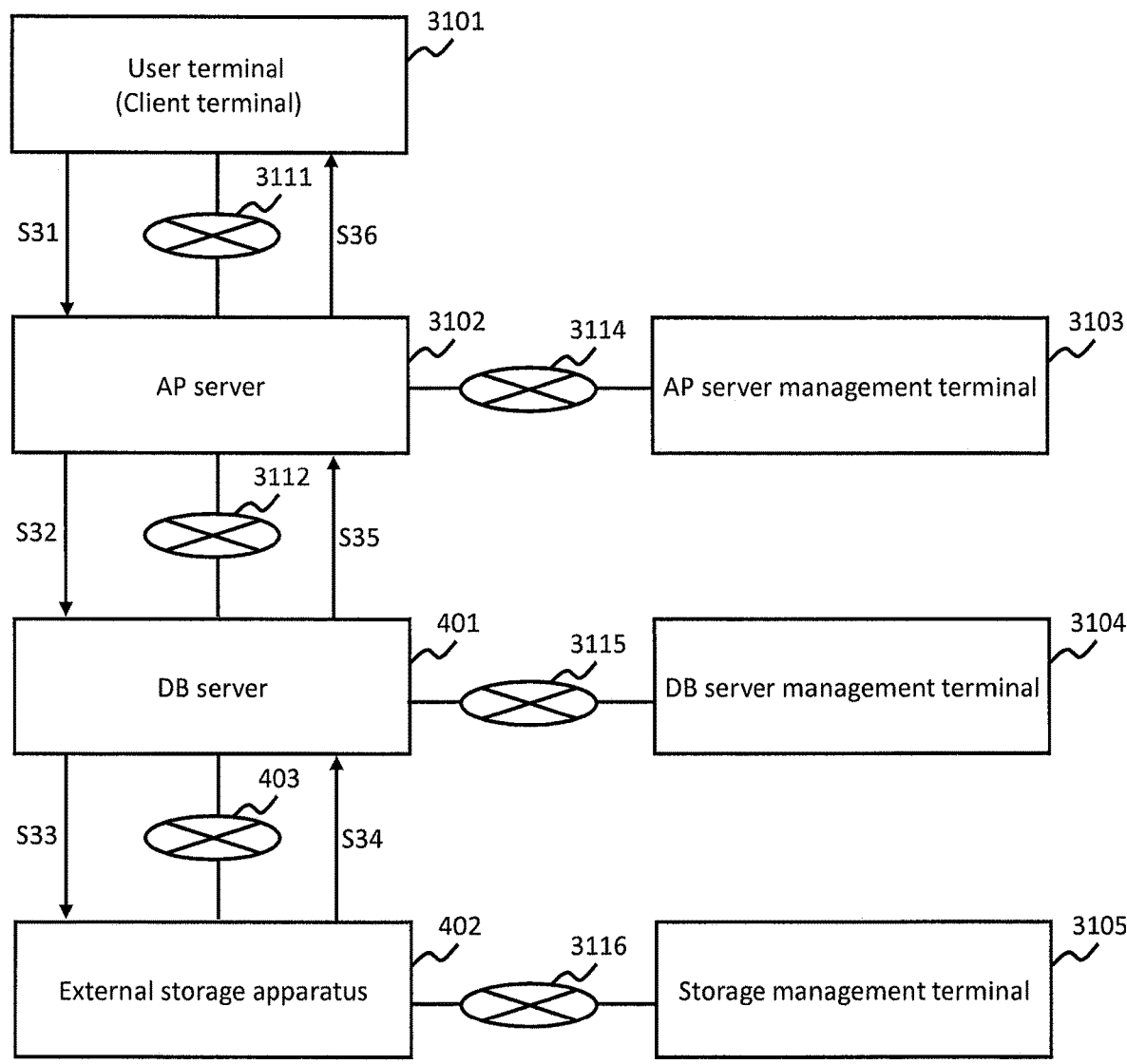
FIG. 25 illustrates a configuration of a computer system according to Embodiment 3.

FIG. 25 illustrates a configuration of a computer system according to Embodiment 3.

An application server (hereinafter, referred to as an AP server) 3102 is coupled to the DB server 401 so as to communicate via a communication network 3112. In addition, the external storage apparatus 402 is coupled to the DB server 401 so as to communicate via the communication network 403. A user terminal (client terminal) 3101 is coupled to the AP server 3102 so as to communicate via a communication network 3111. The DB server 401 executes the DBMS which manages the DB. The external storage apparatus 402 stores the DB. The AP server 3102 executes the AP which issues the query to the DBMS executed by the DB server 401. The user terminal 3101 sends a request to the AP executed by the AP server 3102. A plurality of the user terminals 3101 or a plurality of the AP servers 3102 may exist.

An AP server management terminal 3103, a DB server management terminal 3104, and a storage management terminal 3105 are coupled to the AP server 3102, the DB server 401, and the external storage apparatus 402 via communication networks 3114, 3115, and 3116, respectively. The AP server management terminal 3103 is a terminal which manages the AP server 3102, the DB server management terminal 3104 is a terminal which manages the DB server 401, and the storage management terminal 3105 is a terminal which manages the external storage apparatus 402. At least two terminals among the management terminals 3103 to 3105 may be common (integrated). At least two networks among the communication networks 3111, 3112, 3114, 3115, 3116, and 403 may be common (integrated).

In Embodiment 3, a flow of the following processes may be executed.

(S31) The AP server 3102 receives a request (hereinafter, referred to as a user request) from the user terminal 3101.

(S32) The AP server 3102 generates a query according to the user request received in S31 and issues the generated query to the DB server 401.

(S33) The DB server 401 receives the query from the AP server 3102, executes the query, and issues a data input/output request (for example, a data read request) to the external storage apparatus 402 according to the execution of the query. In some cases, the DB server 401 may issue a plurality of the data input/output requests in parallel in the execution of one query. Therefore, in the execution of the one query, S33 may be performed several times in parallel.

(S34) The DB server 401 receives a response to the data input/output request from the external storage apparatus 402 in the execution of the query. In some cases, the DB server 401 may issue a plurality of the data input/output requests in parallel in the execution of one query. Therefore, in the execution of the one query, S34 may be performed several times in parallel.

(S35) The DB server 401 transmits a result of the execution of the query to the AP server 3102.

(S36) The AP server 3102 receives a result of the execution of the query and transmits a response to the user request received in S31 according to the result of the execution to the user terminal 3101.

In addition, a large number of the user requests for the AP server 3102 or a large number of the queries issued to the DB server may exist simultaneously.

Heretofore, while the several embodiments are described, the invention is not limited to the embodiments, and various modifications are available within the scope without departing from the spirit of the invention.

For example, in the above-described embodiments, in the case where there is one address of the data satisfying the condition of the DB operation, the query execution unit 423 executes the same task without generating a new task to read the data from the DB 451. However, even in the case where there is one address of the data satisfying the condition of the DB operation, the query execution unit 423 may generate a new task (child task) based on the task (parent task) and execute the child task (allocates a data address to the child task) to read the data from the DB 451.

In addition, besides the memory 416 in the DB server 401, the DB 451 may exist in a storage device, for example, the local storage device 415 of which access speed is lower than that of the memory 416.

REFERENCE SIGNS LIST

412 Database management system (DBMS)

The invention claimed is:

1. A database (DB) management system for managing a database existing in a second storage device of which access speed is lower than that of a first storage device, database management system comprising:
a memory coupled to a processor, the memory storing instructions, that when executed by the processor, cause the processor to:
receive a query to the database;
generate a query execution plan including information representing one or more DB operations necessary for executing the received query and an execution procedure of the one or more DB operations; and
execute the query based on the generated query execution plan, dynamically generate tasks for executing the one or more DB operations in the execution of the query, and upon determining two or more executable tasks exist, execute at least two tasks among the two or more tasks in parallel;
generate, in order to manage the execution of the generated tasks, a plurality of task start information which is information representing a content of execution of the task and execute the task based on the content represented by the task start information,
wherein the task start information includes a context and a data address set which corresponds with the context,
wherein the context is information that includes first information representing a DB operation for starting an execution of the newly generated task, which is one of the one or more DB operations as information included in the query execution plan, and second information of an access destination of data necessary for the one or more DB operations represented by the first information,
wherein the data address set is information for identifying an address of access destination data based on the second information of the access destination of the data, and
wherein the memory stores instructions, that when executed by the processor, cause the processor to:
determine, based on the plurality of task start information, whether any context has a data address set, that corresponds with the context, stored in the first storage device,
upon determining that a first context has a first data address set stored in the first storage device, select first task start information including the first context and the first data address set and execute a first task for execution of the first DB operation included in the first task start information, and
upon determining that a second context has a second data address set not stored in the first storage device but stored in the second storage device, select second task start information including the second context and the second data address set and execute a second task for execution of the second DB operation included in second task start information after transferring the second data address set from the second storage device to the first storage device,
wherein the first task for execution of the first DB operation included in the first task start information is executed prior to the second task for execution of the second DB operation included in second task start information, and
wherein the execution of the first DB operation and the transferring of the second data address set used for the first DB operation are performed in parallel.

2. The database management system according to claim 1, wherein the memory further stores instructions, that when executed by the processor, cause the processor to:
upon determining a plurality of the data address sets exist in the first storage device, select task start information including the data address set of which the number of non-accessed data addresses is smallest among a plurality of task start information which respectively includes the plurality of the data address sets.

3. The database management system according to claim 1, wherein the memory further stores instructions, that when executed by the processor, cause the processor to:
measure a generation speed which is the number of the task start information newly generated per unit time and a consumption speed which is the number of the task start information generated per unit time of which all the access destination data are accessed, and
compare the generation speed with the consumption speed, and
read the data address set from the second storage device to the first storage device or remove the data address set read to the first storage device from the first storage device based on a result of the comparison.

4. The database management system according to claim 3, wherein, the memory further stores instructions, that when executed by the processor, cause the processor to:
upon determining the generation speed is higher than the consumption speed as a result of the comparison, remove the data address set of which the number of non-accessed data addresses is larger than a predetermined value from the first storage device.

5. The database management system according to claim 3, wherein, the memory further stores instructions, that when executed by the processor, cause the processor to:
upon determining the generation speed is lower than the consumption speed as a result of the comparison remove the data address set of which the number of non-accessed data addresses is smaller than a predetermined value from the first storage device.

6. The database management system according to claim 3, wherein, the memory further stores instructions, that when executed by the processor, cause the processor to:
upon determining the generation speed is higher than the consumption speed as a result of the comparison read the data address set of which the number of non-accessed data addresses is smaller than a predetermined value among the data address sets which are the one or more data address sets corresponding to the one or more task start information and do not exist in the first storage device from the second storage device into the first storage device.

7. The database management system according to claim 3, wherein, the memory further stores instructions, that when executed by the processor, cause the processor to:
upon determining the generation speed is lower than the consumption speed as a result of the comparison read the data address set of which the number of non-accessed data addresses is larger than a predetermined value among the data address sets which are the one or more data address sets corresponding to the one or more task start information and do not exist in the first storage device from the second storage device to the first storage device.

8. The database management system according to claim 1, wherein, the memory further stores instructions, that when executed by the processor, cause the processor to:
upon determining an amount of free space where the data address sets are storable is larger than a predetermined amount in the first storage device, the DB buffer management unit is configured to read the one or more data address sets in the second storage device from the second storage device to the first storage device.

9. A computer which manages a database (DB), comprising:
a first storage device; and
a memory coupled to a processor, the processor coupled to the first storage device,
wherein the database is in a second storage device of which access speed is lower than that of the first storage device,
wherein the memory stores instructions, that when executed by the processor, cause the processor to:

receive a query to the database,
generate a query execution plan including information representing one or more DB operations necessary for executing the received query and an execution procedure of the one or more DB operations,
execute the query based on the generated query execution plan, dynamically generate tasks for executing the one or more DB operations in the execution of the query, and upon determining two or more executable tasks exist, execute at least two tasks among the two or more tasks in parallel, and
generate, in order to manage the execution of the generated tasks, a plurality of task start information, which is information representing a content of execution of the task and executes the task based on the content represented by the task start information,
wherein the task start information includes a context and a data address set which corresponds with the context,
wherein the context is information that includes first information representing a DB operation for starting an execution of the newly generated task, which is one of the one or more DB operations as information included in the query execution plan, and second information of an access destination of data necessary for the one or more DB operations represented by the first information,
wherein the data address set is information for identifying an address of access destination data based on the second information of the access destination of the data, and
wherein the memory further stores instructions that when executed by the processor, cause the processor to:
determine, based on the plurality of task start information, whether any context has a data address set, that corresponds with the context, stored in the first storage device,
upon determining that a first context has a first data address set stored in the first storage device, select first task start information including the first context and the first data address set and execute a first task for execution of the first DB operation included in the first task start information,
upon determining that a second context has a second data address set not stored in the first storage device but stored in the second storage device, select a second task start information including the second context and the second data address set and execute a second task for execution of the second DB operation included in second task start information after transferring the second data address set from the second storage device to the first storage device,
wherein the first task for execution of the first DB operation included in the first task start information is executed prior to the second task for execution of the second DB operation included in second task start information, and
wherein the execution of the first DB operation and the transferring of the second data address set used for the first DB operation are performed in parallel.

10. The computer according to claim 9,
wherein the memory further stores instructions, that when executed by the processor, cause the processor to:
measure a generation speed which is the number of the task start information newly generated per unit time and a consumption speed which is the number of the task start information generated per unit time of which all the access destination data are accessed, and compare the generation speed with the consumption speed, and wherein the control device is configured to read the data address set from the second storage device to the first storage device or remove the data address set read to the first storage device from the first storage device based on a result of the comparison.

11. A database management method for managing a database (DB), having a memory coupled to a processor, existing in a second storage device of which access speed is lower than that of a first storage device, the database management method comprising:

receiving a query to the database;

generating a query execution plan including information representing one or more DB operations necessary for executing the received query and an execution procedure of the one or more DB operations;

executing the query based on the generated query execution plan, dynamically generating tasks for executing the one or more DB operations in the execution of the query, and upon determining two or more executable tasks exist, executing at least two tasks among the two or more tasks in parallel;

generating, in order to manage the execution of the generated tasks, a plurality of task start information which is information representing a content of execution of the task and manages the task start information, and executing a task based on the content represented by the task start information, the task start information including a context and a data address set which corresponds with the context, the context being information including first information representing a DB operation for starting an execution of the newly generated task, which is one of the one or more DB operations as information included in the query execution plan, and second information of an access destination of data necessary for the one or more DB operations represented by the first information, the data address set is information for identifying an address of access destination data based on the second information of the access destination of the data, and the database management method further comprising:

determining, based on the plurality of task start information, whether any context has a data address set, that corresponds with the context, is stored in the first storage device, upon determining that a second context has a second n data address set not stored in the first storage device but stored in the second storage device, select second task start information including the second context and the second data address set and execute a second task for execution of the second DB operation included in second task start information after transferring the second data address set from the second storage device to the first storage device, wherein the first task for execution of the first DB operation included in the first task start information is executed prior to the second task for execution of the second DB operation included in second task start information, and wherein the execution of the first DB operation and the transferring of the second data address set used for the first DB operation are performed in parallel.

12. The database management system according to claim 1, wherein, the memory further stores instructions, that when executed by the processor, cause the processor to:

increase an available capacity of the first storage device by deleting a third data address set, which is previously stored in the first storage device, wherein the deletion of the third data address set allows for the second data address set to be transferred to the first storage device.

13. The computer which manages a database according to claim 9, wherein, the memory further stores instructions, that when executed by the processor, cause the processor to:

increase an available capacity of the first storage device by deleting a third data address set, which is previously stored in the first storage device, wherein the deletion of the third data address set allows for the second data address set to be transferred to the first storage device.

14. The database management method according to claim 11, further comprising the steps of:

increasing an available capacity of the first storage device by deleting a third data address set, which is previously stored in the first storage device, wherein the deletion of the third data address set allows for the second data address set to be transferred to the first storage device.

* * * * *